(12) United States Patent
Sullivan et al.

(10) Patent No.: US 7,356,486 B2
(45) Date of Patent: Apr. 8, 2008

(54) SYSTEM AND METHOD FOR ADMINISTERING PROMOTIONS

(75) Inventors: Thomas J. Sullivan, Weston, CT (US); Richard J. Windish, Lindenhurst, IL (US); Dorr H. Lewright, Lindenhurst, IL (US); Joseph M. Trattner, North Aurora, IL (US); Suzanne K. Arenson, Glenview, IL (US); George Colunga, Libertyville, IL (US); Kathy S. Hackett, McHenry, IL (US); Joica C. Campbell, Cary, IL (US)

(73) Assignee: NCH Marketing Services, Inc., Deerfield, IL (US)

( * ) Notice: Subject to any disclaimer, the term of this patent is extended or adjusted under 35 U.S.C. 154(b) by 469 days.

(21) Appl. No.: 09/385,489

(22) Filed: Aug. 30, 1999

(65) Prior Publication Data

US 2001/0018665 A1    Aug. 30, 2001

(51) Int. Cl.
*G06Q 30/00* (2006.01)
*G06Q 20/00* (2006.01)
(52) U.S. Cl. .................... 705/14; 705/16; 705/21
(58) Field of Classification Search ............. 705/14, 705/16, 21
See application file for complete search history.

(56) References Cited

U.S. PATENT DOCUMENTS

| | | | |
|---|---|---|---|
| 3,959,624 A | 5/1976 | Kaslow | |
| 4,554,446 A | 11/1985 | Murphy et al. | |
| 4,674,041 A | 6/1987 | Lemon et al. | |
| 4,723,212 A | 2/1988 | Mindrum et al. | |
| 5,008,519 A | 4/1991 | Cunningham et al. | |
| 5,056,019 A * | 10/1991 | Schultz et al. | ........... 705/14 |
| 5,173,851 A | 12/1992 | Off et al. | |
| 5,185,695 A | 2/1993 | Pruchnicki | |
| 5,193,056 A | 3/1993 | Boes | |
| 5,202,826 A | 4/1993 | McCarthy | |
| 5,233,514 A | 8/1993 | Ayyoubi et al. | |
| 5,237,499 A | 8/1993 | Garback | |
| 5,287,181 A | 2/1994 | Holman | |
| 5,353,218 A | 10/1994 | De Lapa et al. | |
| 5,380,991 A | 1/1995 | Valencia et al. | |
| RE34,915 E | 4/1995 | Nichtberger et al. | |
| 5,420,606 A | 5/1995 | Begum et al. | |
| 5,490,060 A | 2/1996 | Malec et al. | |
| 5,557,518 A | 9/1996 | Rosen | |

(Continued)

FOREIGN PATENT DOCUMENTS

WO    WO 95/30199    11/1995

OTHER PUBLICATIONS

Crecca, Donna Hood, Reward Systems, Jul. 6, 1998, Convenience Store News, p. 27.*

(Continued)

*Primary Examiner*—James Myhre
*Assistant Examiner*—Daniel Lastra
(74) *Attorney, Agent, or Firm*—Bell, Boyd & Lloyd LLP

(57) ABSTRACT

A system for administering scan-based promotions involving manufacturers and retailers. The system records the terms of the promotion, ensures that the promotion is conducted in compliance with the agreed terms, settles the promotion and provides continual promotion progress for review by the retailers and the manufacturers.

82 Claims, 16 Drawing Sheets

U.S. PATENT DOCUMENTS

| | | | |
|---|---|---|---|
| 5,612,868 A | | 3/1997 | Off et al. |
| 5,621,640 A | | 4/1997 | Burke |
| 5,710,886 A | | 1/1998 | Christensen et al. |
| 5,761,648 A | | 6/1998 | Golden et al. |
| 5,832,458 A | * | 11/1998 | Jones .......................... 705/14 |
| 5,845,259 A | * | 12/1998 | West et al. ................... 705/14 |
| 5,890,135 A | * | 3/1999 | Powell ........................ 705/14 |
| 5,902,983 A | | 5/1999 | Crevelt et al. |
| 5,905,246 A | * | 5/1999 | Fajkowski .................. 235/375 |
| 5,918,211 A | * | 6/1999 | Sloane ........................ 705/16 |
| 5,924,077 A | | 7/1999 | Beach et al. |
| 5,924,078 A | | 7/1999 | Naftzger |
| 2003/0195806 A1 | * | 10/2003 | Willman et al. .............. 705/14 |

OTHER PUBLICATIONS

Wellman, David, First steps toward scan-based trading, Aug. 1997, Supermarket Business, p. 28.*

Anonymous, It's Time for Promotion Programs to Measure Up, Jun. 1994, Promo, p. 42.*

Disclosure of NuWorld Marketing Limited Coupon Processing System (3 pages).

Efficient Consumer Response, written by Kurt Salmon Associates, published in 1993.

Trade Promotion Spending & Merchandising 1998 Industry Study, written by Cannondale Associates, published in 1998.

* cited by examiner

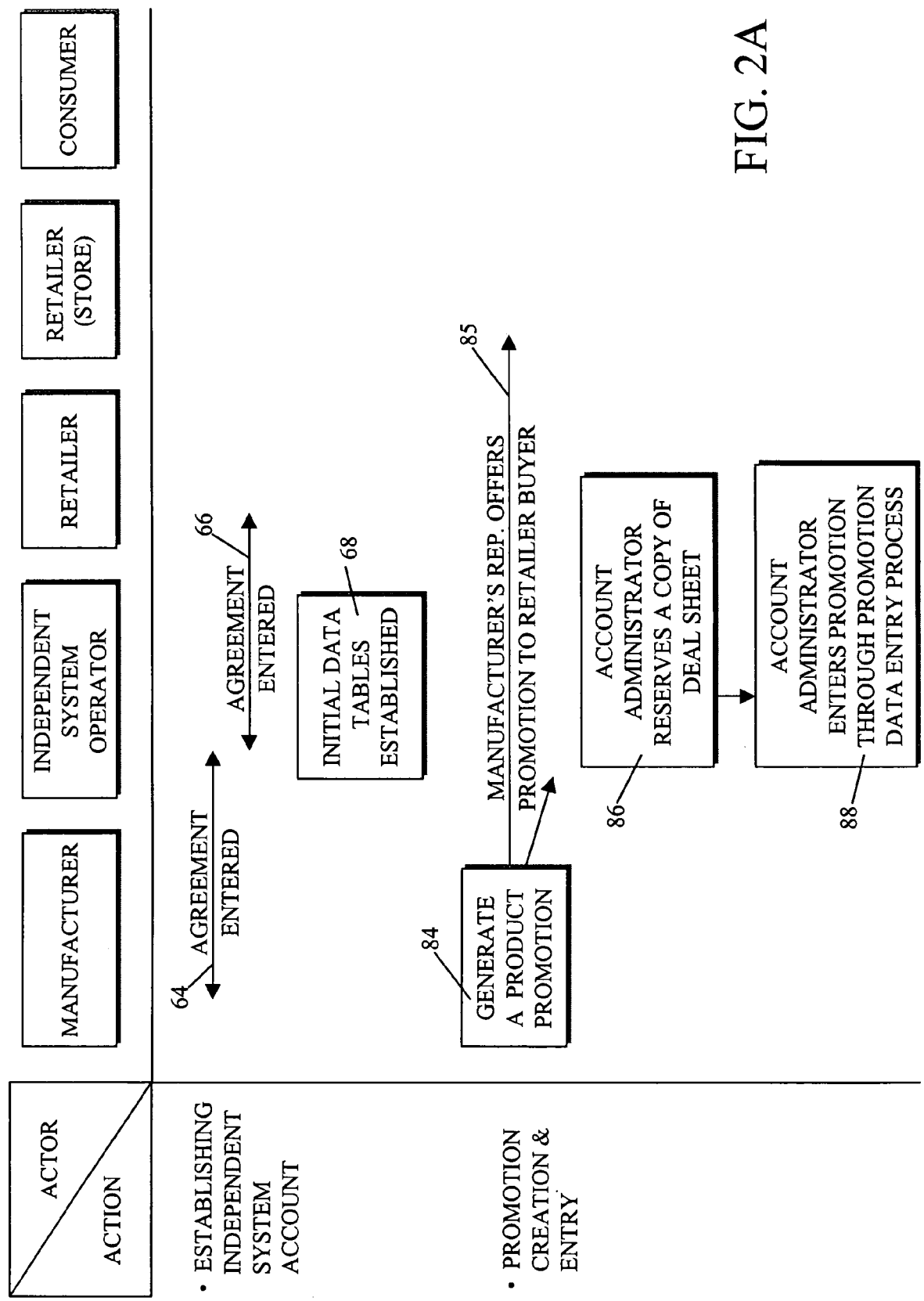

SYSTEM AND METHOD FOR ADMINISTERING PROMOTIONS

The present invention relates in general to a system and method for administering promotions, and in particular to a system and method which captures, records, tracks, reports, monitors, verifies and settles product promotions for retailers and manufacturers.

BACKGROUND OF THE INVENTION

Product manufacturers and retailers have run or been involved with a variety of promotions to sell their products. For purposes of this application, "manufacturers" include manufacturers, distributors, suppliers, brokers and vendors of products such as consumer packaged goods. For purposes of this application, "retailers" include retailers and other businesses which sell products such as consumer packaged goods on a wholesale or retail basis to customers or consumers, e.g., supermarkets, mass merchandisers and chain drug stores.

One type of promotion is generally known in the industry as a "consumer promotion" or a "direct promotion." One of the most prevalent "consumer promotions" involves promotions where the manufacturer sets the terms of the promotion, prints and distributes coupons directly to the consumer (through a number of methods or agents, such as free-standing inserts in newspapers or magazines, direct mail, on-package coupons or in-store). The consumer receives a discount on the price of the purchased product when the consumer presents the coupon to the retailer at the time of purchase. The retailer treats the product sale as a "full price" sale on its books and does not realize the full cash value of the sale until the manufacturer reimburses the retailer for the coupon. The retailer usually does not have much input into the nature, terms or conduct of such promotions. The retailer essentially acts as a conduit between the manufacturer and the consumer for handling, honoring or processing the manufacturer's discount to the consumer. For the most part, such promotions are planned for and delivered to the consumer without the input of the retailers (i.e., the manufacturers establish the promotion region, the terms of the promotion, the products to be promoted, the time period for the promotion and various other promotion terms).

Another type of promotion is generally known in the industry as a "trade promotion" or an "indirect promotion." Most "trade promotions" involve promotion funds the manufacturer pays to the retailer. The retailer may or may not pass along these funds to the consumer.

In one form of trade promotion, the manufacturer presents promotion funds to the retailers in the form of off-invoice allowances. Specifically, the manufacturer sells cases or large quantities of the promoted product to retailers at a reduced cost. The terms of this type of promotion are set by the manufacturers, and the manufacturers usually offer these promotions equally to every retailer.

In other forms of trade promotions, the retailer is more involved in customizing or creating the trade promotion. This is due, among other things, to: (1) the frequent shopper, advertising, display and scan-down programs where retailers tailor their promotions to distinguish themselves from other retailers; (2) the substantial emphasis on performance under or results of the promotion; (3) the changing marketing relations with consumers; and (4) the increases in the retailers' size and purchasing power over the past several years. Accordingly, manufacturers and retailers, through their respective representatives, frequently negotiate or collaborate on the nature and terms of specific promotions. It should be appreciated that not every such trade promotion is negotiated or collaborated. If the nature and terms of the promotion are acceptable, the retailer simply accepts the promotion "as offered" by the manufacturer. Such trade promotions, in contrast to the other types of trade promotions and the consumer promotions described above, create flexible promotions which are more tailored to the retailer's marketing and local needs.

One of the more prevalent type of trade promotions is known in the industry as or referred to as "scan-based trade promotions" or "scan-pay trade promotions." They are referred to as "scan-based" or "scan-pay" because the performance of the promotion can be tracked by reviewing the participating stores' conventional point-of-sale ("POS") system data or information. Scan-based trade promotions enable the collection of useful data on the promotion by recording the actual number of promoted products sold during the promotion period, rather than by recording data on the number of cases of the promoted product purchased by the retailer. In these scan-based trade promotions, the retailer usually passes a discount received from the manufacturer along to the consumer in one of two forms: (1) a reduced product price promotion; or (2) an electronic discount promotion.

When the discount is passed to the consumer in the form of a reduced product price, the price of the promoted product is reduced for every promoted product purchased by every purchaser. The intended discount to the consumer is part of the price that is recorded in the POS system in a single scan entry.

When the retailer offers the promotion in the form of an electronic discount, the consumer receives the discount by presenting a discount triggering device such as a retailer shopping card (usually designated as a frequent shopper card which is part of the retailer's frequent shopper program) depending on the retailer's marketing plan. In this electronic discount promotion, the consumer is first charged the full retail price of the promoted product before a discount entry is applied to lower the consumer's actual purchase price. It should be appreciated that this method enables the retailer to provide the intended promotion benefit to some or all of the consumers purchasing the promoted product. Different consumers may also be given different discounts based upon their status or amount of purchasing.

Sometimes the nature and terms of the promotion do not require the retailer to pass discounts along to the consumer. For instance, if the manufacturer and retailer agree that the retailer will display or place the promoted product at the end of an aisle or place an advertisement for the promoted product in a local newspaper in the retailer's advertisement, the manufacturer pays an agreed upon "merchandising" fee to the retailer for this promotion. The manufacturer can determine if the retailer complies with this promotion by checking the appropriate local newspapers or visiting the retailer's stores as appropriate, but cannot easily track the results of the promotion.

The systems for administering the homogenous manufacturer-driven consumer promotions are less applicable to the increasing number of such trade promotions and particularly scan-based trade promotions. Unlike manufacturer-driven consumer promotions which are tracked by the single set of terms set by the manufacturer, the process for administering a number of concurrent customized scan-based trade promotions is currently fragmented, cumbersome and involves numerous manual steps. Moreover, the current systems do not sufficiently handle the various different types of trade promotions.

The current process for administering scan-based trade promotions is as follows. A manufacturer representative offers a promotion to a retailer buyer or merchandiser approximately two to three weeks prior to the start of the promotion by providing the retailer buyer the nature and terms of the promotion in the form of an electronic or paper deal sheet (as required by the retailer). Generally, the retailer buyer covers a specified geographic location for the retailer. The retailer buyer evaluates the proposed promotion and analyzes it in terms of the retailer's needs (business objectives of the promotion, timing of the promotion, financial impact of the promotion, marketing impact of the promotion, etc.). After evaluating the proposed promotion, the retailer's buyer either accepts the promotion as is, negotiates different terms for the promotion or rejects the promotion outright.

Once the retailer buyer and the manufacturer representative reach an agreement on the promotion, the manufacturer and the retailer each have an independent method for tracking the promotion. These tracking methods may be manual or automated. The manufacturer and retailer tracking methods operate independently of one another, and there is generally no communication or verification of the promotion between these two separate methods. The manufacturer and the retailer have no way of verifying that the other party correctly understands the terms of the promotion or that they are correctly implementing or tracking the promotion. Prior to the promotion being executed, if the retailer desires to change the terms of the promotion for whatever reason (e.g., a retailer wants to postpone a planned promotion of ice cream because a decrease in temperature is forecasted for the originally agreed period of the promotion), the retailer often does not contact the manufacturer to re-negotiate negotiate the promotion or notify the manufacturer of the retailer's change. Such changes make it virtually impossible using current systems to correctly track the promotion particularly given the different tracking methods of the retailer and the manufacturer.

Prior to the start of the product promotion, the retailer orders sufficient stock of the promoted product (if necessary) and places the appropriate advertisements or signage for the promotion (if necessary). The retailer also communicates the necessary promotion information, including the special prices or handling (discount) of UPC codes of the products involved in the promotion, to its POS systems in each retailer store. The promotion hopefully begins on the agreed upon start date and hopefully runs to the agreed upon end date. As customers purchase the promoted product, the retailer's in-store POS system (including the check-out scanning equipment) reads the UPC code of the scanned product. If the retailer is running a scan-based reduced price promotion, the discount is reflected in the product's reduced price. The POS system stores this promoted product POS data or information in the store's central POS computer with the other product POS data. If the retailer is running an electronic discount promotion, the customer may be required to present a discount triggering device, such as a frequent shopper card, to the sales clerk to receive the discount. The sales clerk scans the frequent shopper card and the POS system recognizes a linked code from the UPC file which credits (i.e., reduces the price to) the customer by the amount of the discount. The linked code is a locally assigned code number programmed by the retailer. This code is commonly called a "coupon price look up (PLU)" code in the industry although no physical coupon is involved in this type of transaction. The POS system also stores this POS data or information in the store's central POS computer. All of the product POS data or information, including the discounts provided, are referred to in the industry as POS movement data. At regular intervals (usually daily or weekly), the systems at the retailer's headquarters automatically retrieve the stored product POS data or POS movement data from the retailer's stores. Once retrieved, the retailer's headquarters systems process the data and store it in a central POS movement database, often referred to as a "data warehouse."

Either manually, or sometimes with systems support, the retailer uses the data warehouse to determine the amount of money the manufacturer owes the retailer under the terms of the scan-based promotion. The retailer's accounting department then either: (1) generates an invoice for the calculated amount and sends it to the manufacturer for payment; or (2) deducts the calculated amount from any amounts the retailer owes the manufacturer. In some, but not many instances, the retailer produces some type of reduced payment, charge back, or deduction notice or notation for the manufacturer. The retailer forwards the retailer's invoice or the reduced payment notice (and the reduced payment) to the manufacturer. Upon receipt, the manufacturer's financial personnel process the retailer's invoice or reduced payment notice (and reduced payment). Usually, the manufacturer's financial personnel merely accept the invoice or reduced payment notice (and reduced payment) without the ability to verify that the retailer's calculated amount is correct, the number of promoted products sold by the retailer during the promotion period, the amount of the discount given to the consumers or that the promotion was conducted according to the other terms of the promotion. In many instances, the retailer simply makes the deduction without notifying the manufacturer.

There are several problems with this system of administering scan-based trade promotions. The main problem for the retailer is that the retailer may wait a significant period of time (up to 45 days) for reimbursement for the discounts given to customers on the promoted product. The retailer must also spend a significant number of man-hours processing the POS movement data, preparing an invoice for the manufacturer, handling a deduction, and in some instances creating a reduced payment notification for the manufacturer. The retailer also must deal with the possibility that it may potentially fail to track a promotion altogether or that the retailer may fail to track all of the products involved in the promotion.

The main problem for the manufacturer is that the manufacturer has no effective method of verifying the retailer's invoice or the accuracy of the reduced payment notice in a timely manner. Manufacturers generally prefer to avoid retailer deductions from invoice or product payments especially when the retailer does not provide notice of such deductions. Manufacturers preferably desire a system which determines the manufacturer's actual cost liability during the period of the promotion before the retailer sends a reduced payment. Further, under the present manual systems, the manufacturer has no effective method of verifying that the promotion is being executed in accordance with the terms of the promotion. Specifically, the manufacturer has no effective method of verifying the number of promoted products sold according to the terms of the deal sheet including the agreed upon time frame and for the agreed upon promotion price or discount.

Further, as with any manual system, there is a significant potential for error due to the manual transcription or miscalculation of information for both the retailers and the manufacturers. The manufacturer and the retailer have no way of monitoring results of the scan-based promotion during the promotion. Accordingly, there is a need for a system and method for administering promotions and specifically for overcoming these problems in the recording, tracking, reporting, monitoring, verifying and settling of or facilitating payment for scan-based trade promotions.

SUMMARY OF THE INVENTION

The present invention overcomes the above problems by providing a system and method for administering promotions and specifically for efficiently and effectively recording, capturing, tracking, reporting, monitoring, verifying and settling product promotions including scan-based trade promotions entered into the system. The system of the present invention includes an automated independent recording, capturing, tracking, reporting, monitoring, verifying and clearing or settling system ("independent system") which: (1) captures and stores the nature and terms of the promotions involving or agreed upon by a retailer and a manufacturer; (2) provides the manufacturer and retailer access to the stored nature and terms of the promotion as well as other relevant information; (3) establishes communication with the appropriate systems (such as the retailer's POS system) to obtain POS information or data on the promoted product (for scan-based trade promotions); (4) processes and verifies the promoted product POS data for both the retailer and the manufacturer to determine the amount of money the manufacturer owes to the retailer for the scan-based trade promotion; (5) provides the manufacturer and retailer access to the processed promoted product POS data and payment information including an identification of the promoted products, the number of promoted products sold (to a certain date) during the promotion, the amount of money the manufacturer owes the retailer and the amount of money paid to the retailer (to a certain date); (6) provides the manufacturer and retailer with a system for communication of internal or confidential information regarding the promotion and future promotions; and (7) settles (i.e., pays) or otherwise facilitates payment of the retailer for the promotion. For purposes of this application, "payment information" includes all information relating to the amount of money owed by the manufacturer to the retailer for the promotion and the related payment information. The system uses suitable graphical interfaces for providing the retailer and manufacturer access to the system.

Generally, a representative of the independent system operator manually enters terms of the promotion into the independent system. Alternatively, this may be done in an automated manner by receiving an electronic download of promotion terms from the retailer's system or the manufacturer's system, or both. The independent system enables both the retailer and the manufacturer to access the independent system to determine the status and results (to a certain date) of the promotion monitored by the independent system. During the promotion, the retailer's systems periodically communicate filtered or unfiltered promoted product POS data (for scan-based trade promotions) to the independent system. The independent system verifies that the promoted product POS data is acceptable for processing by the independent system and that the number of sales of the promoted product fall within acceptable tolerances. If the promoted product POS data is acceptable and within tolerances, the independent system processes the promoted product POS data in accordance with the terms of the scan-based promotion and creates a database settlement table. The settlement table preferably includes all of the promotions monitored by the independent system and entered into between a plurality of retailers and a manufacturer for a specific period of time. The independent system uses the settlement table to calculate or determine the payment information including the amount of money the manufacturer owes each retailer. The independent system then facilitates, preferably through electronic funds transfer or retailer deductions, the proper payment for the promotion from the manufacturer to each retailer, or alternatively, documents the payment amount on which the retailer bases a charge back or deduction. The system of the present invention is intended to significantly reduce the amount of time which each retailer must wait for payment.

The system of the present invention may be used to administer any scan-based trade promotion involving a retailer and a manufacturer which may be verified using promoted product POS data. The system may also be used to administer any trade promotion which may be based upon the verification of some other form of merchandising, compliance (e.g., display or advertising). Additionally, the system may be adapted to administer any other "trading" agreements involving a manufacturer and retailer based on product POS data. For example, the system of the present invention may be used to credit and settle accounts between a retailer and a manufacturer for the return of products by the retailer to the manufacturer. The system of the present invention may also be used to administer a consignment type agreement called "scan-based trading," wherein the system records, tracks, reports, monitors, verifies and settles retailer payments to the manufacturers for products actually (as verified by POS data) sold by the retailer rather than for charging the retailer for a manufacturer's products received in the retailer's warehouse or received in the retailer's stores as is presently the practice for most product manufacturers. In such case, the system of the present invention would account for or report the pricing/cost of the manufacture's original products, track product sales (i.e., product POS data) of the consigned product, and execute or facilitate the financial payment between manufacturer and retailer preferably through an electronic funds transfer system.

The system of the present invention provides numerous other advantages including: (a) recording discounts for promoted products; (b) recording when the POS system fails to make the appropriate discounts for promoted products; (c) administer promotions which are not directly scan-based such as newspaper advertising promotions or preferential display promotions; (d) administering promotions having variable discounts such as for different categories of customers; and (e) providing rapid financial settlement by making payments for promotions using the best available electronic funds transfer system such as the Federal Reserve ACH network or more advanced systems developed in the future.

It is therefore an object of the present invention to provide a system and method for administering promotions.

Another object of the present invention is to provide a system and method for capturing and storing the terms of a promotion involving a retailer and a manufacturer, providing the manufacturer and retailer access to the terms of the promotions, collecting the retailer promoted product POS data, processing and verifying the promoted product POS data for both the retailer and the manufacturer, providing the manufacturer and retailer access to the processed promoted product POS data and settling the promotion for both the manufacturer and retailer.

Another object of the present invention is to provide a system and method for administering scan-based trade promotions involving a retailer and a manufacturer.

Another object of the present invention is to provide a system and method for administering scan-based trade promotions involving a retailer and a manufacturer and for reporting the terms, status, results and the settlement of the promotion to the retailer and the manufacturer on-line, including through the internet.

A further object of the present invention is to provide a system and method for administering a plurality of product promotions entered into between a plurality of retailers and a plurality of manufacturers.

A still further object of the present invention is to provide a system and method for administering product promotions involving retailers and manufacturers which aggregates the payment information for multiple retailers for billing and debiting each manufacturer.

Other objects, features and advantages of the present invention will be apparent from the following detailed disclosure, taken in conjunction with the accompanying sheets of drawings, wherein like reference numerals refer to like parts or processes.

DESCRIPTION OF THE DRAWINGS

FIG. 2A is a flow diagram depicting the establishment of the initial data tables and the creation and entry of the terms of the promotion;

DETAILED DESCRIPTION OF THE INVENTION

The system of the present invention is adapted to administer promotions and specifically scan-based trade promotions for product manufacturers and retailers. For purposes of this application, the term "manufacturer" includes manufacturers, distributors, suppliers, brokers and vendors of products such as consumer packaged goods, and the term "retailer" includes retailers and other businesses which sell products such as consumer packaged goods on a wholesale or retail basis to customers or consumers. The system of the present invention records or captures the terms of the promotion, makes the terms of the promotion readily available through electronic means (including the internet) to both the retailer and the manufacturer, monitors the promotion and verifies that the promotion is conducted in compliance with the promotion terms, provides continual promotion progress reporting to the retailer and the manufacturer and facilitates settlement of the promotion. The system of the present invention may be employed to administer other scan-based transactions between the retailer and the manufacturer, such as a return of product to a manufacturer from a retailer or a scan-pay system wherein the retailer only pays the manufacturer for products which the retailer sells.

System Structure

Figure 1:
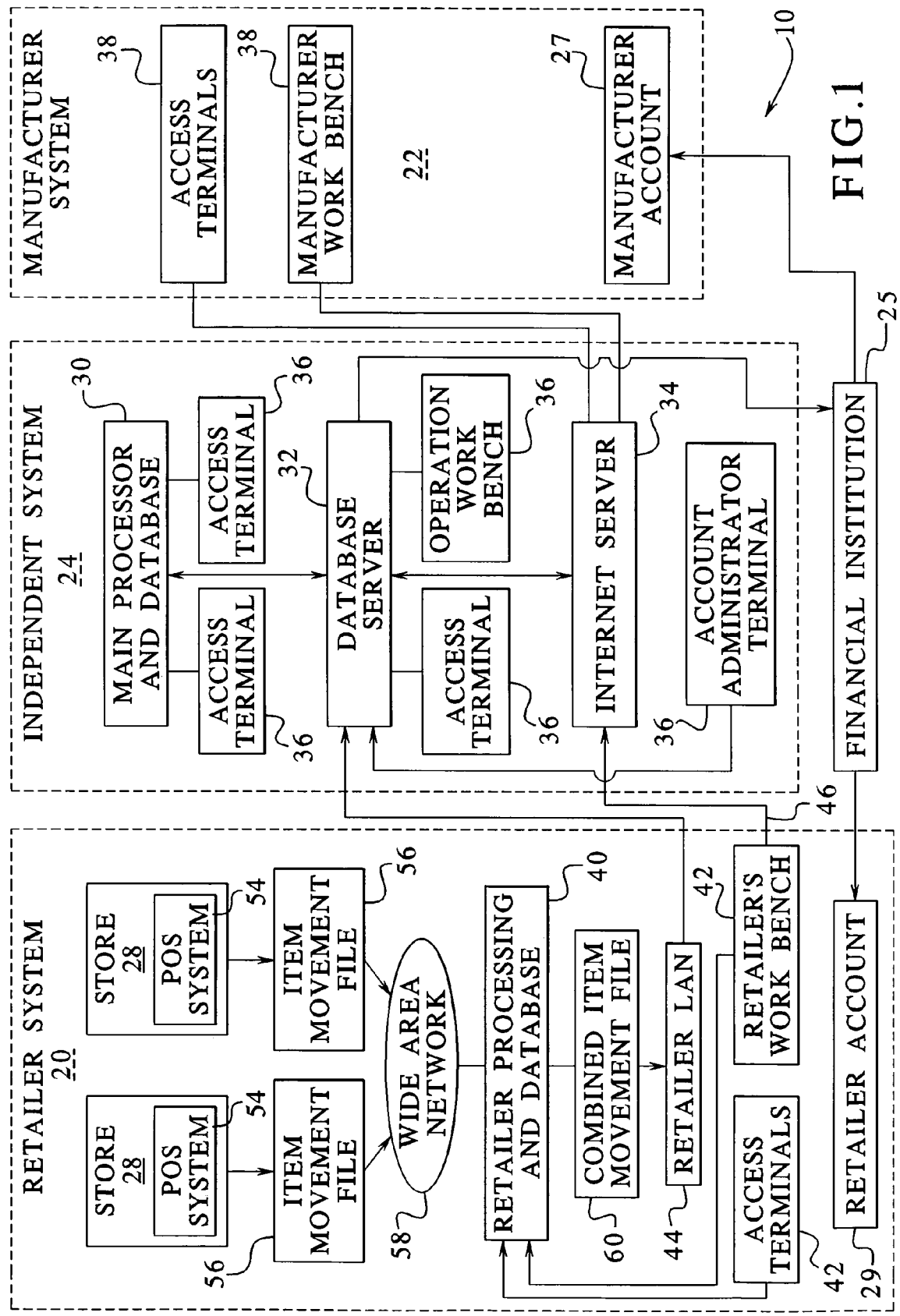
FIG. 1 is a schematic illustration of the system of the present invention for administering promotions.

Referring now to the figures, and particularly to FIG. 1, the system of the present invention, generally indicated by numeral 10, includes a retailer system 20, a manufacturer system 22 and an independent recording, tracking, reporting, monitoring, verifying and clearing or settling system ("independent system") 24 including communicating with a financial institution 25 through an electronic funds transfer system. The retailer system 20 is preferably located at each participating retailer's headquarters or at each participating retailer's regional marketing area (RMA) headquarters and in each participating retailer's stores 28. The manufacturer system 22 is preferably located at each participating manufacturer's headquarters or the manufacturer's regional offices, but can be employed wherever a manufacturer representative can access the independent system such as through direct communications or the internet. The independent system 24 is preferably located in the facilities of an independent system operator.

It should be appreciated that a plurality of retailers and a plurality of manufacturers will preferably use the system 10 for administering promotions and specifically scan-based trade promotions between the plurality of manufacturers and retailers. The system 10 enables a participating manufacturer to track a number of promotions with either one retailer or several retailers. Similarly, the system 10 enables a participating retailer to track a number of promotions with either one manufacturer or several manufacturers. For simplicity and brevity, one promotion involving one manufacturer and one retailer is primarily discussed in this application.

Independent System

In the preferred embodiment, the independent system 24 includes a main processor and database 30 for processing the promoted product POS data pursuant to the promoted terms, invoicing the manufactures (including the service fees) executing the payments (including fees) and aggregating settlement information, a database server 32 for collecting the terms of the promotion and the promoted product POS data, an Internet server 34 for enabling the retailer and the manufacturer to access the stored promotion terms, the processed promoted product POS data and the settlement information and a plurality of conventional operator access terminals 36 connected to the processor 30 and the database server 32. In alternative embodiments of the present invention, the functions or processes of and data stored on the main processor 30, the database server 32 and the Internet server 34 could be accomplished by one computer or a network of computers linked together.

The main processor 30 may include a conventional mainframe operating system, applications and suitable databases (such as CA DATACOM database). The database server 32 may include conventional operating systems such as Microsoft Windows NT and a standard query language (SQL) server 7.0 database. The database residing on the database server 32 is preferably a relational database which employs SQL to carry out its functions, although it should be appreciated that other suitable database structures could be employed in the system of the present invention. The main processor 30 communicates with the database server 32, and the database server 32 communicates with the internet server 34. At least one and preferably several of the plurality operator access terminals 36 which communicate with the database server 32 function as operations workbenches or terminals to enable an operator to enter relevant data into the database server 32.

The independent system 24 also includes several access terminals 36 which function as account administrator workbenches or terminals which enable account administrators for each retailer to enter promotion information into the database server 32. The account administrator workbenches preferably are physically located at the retailer's headquarters; though, they are not part of the retailer system 20. The account administrator workbenches could be physically located at any suitable alternative location. The account administrator workbenches communicate with the database server 32 of the independent system 24.

As discussed in more detail below, the database server 32 communicates with an appropriate financial institution 25 to facilitate electronic fund transfers or other payments from a manufacturer account 27 to a retailer account 29.

Retailer System

In this embodiment of the present invention, the retailer system 20 includes a main processor and database 40 such as a mainframe computer, a number of access terminals 42 and a local area network (LAN) 44. The retailer processor 40 in the retailer system 20 communicates over available communications lines 46 (such as telephone lines) with the database server 32 of the independent system 24 through the retailer LAN 44. This is preferably an internet connection although it could be a dial-up or other suitable connection. At least one and preferably several of the access terminals 42 are designated as retailer workbenches or terminals. The retailer workbenches communicate with the internet server 34 of the independent system 24. The retailer workbenches are preferably located at the retailer's headquarters, although they could reside at any suitable alternative location. The retailer workbenches may be any computer or machine capable of communicating with the independent system, including but not limited to communications through an internet service provider (ISP).

The retailer's stores 28 include numerous conventional check-out stations (not shown). In each store 28, the check-out stations have conventional universal product code (UPC) scanners (not shown) linked to an in-store POS computer system 54. The in-store POS system 54 collects and stores all of the consumer or customer product purchase information and data (i.e., "POS data") for the store 28. The POS systems 54 used in the retailer stores 28 are well known in the industry.

The POS systems 54 of the retailer stores 28 communicate with the main processor 40 in the retailer system 20 via a retailer wide area network (WAN) 58. On a periodic basis (hourly, daily or weekly), the retailer's in-store POS systems 54 send the stored product POS data (including the promoted product POS data) from the retailer's stores 28 in item movement files 56 (or other such formats which convey the same data) to the retailer's main processor 40 via the retailer's WAN 58. When the retailer's main processor 40 receives the item movement files 56, the retailer's main processor 40 consolidates the item movement files 56 into a consolidated or combined item movement file 60. After consolidation, the main processor 40 may send the consolidated or combined item movement file 60 to a data warehouse for storage or possible later processing; or either (i) filter the consolidated item movement file 60 and then send the filtered item movement file 60 to the independent system 24 for further processing; or (ii) send the unfiltered consolidated item movement file 60 directly to the independent system 24 for filtering and further processing.

Manufacturer System

The manufacturer system 22 includes a plurality of access terminals 38. At least one and preferably several of the access terminals 38 function as manufacturer workbenches or terminals which communicate with the internet server 34 in the independent system 24. The manufacturer workbench is preferably at the manufacturer's headquarters or regional offices, but may be located at any suitable site or may be a portable access terminal. The manufacturer workbench similar to the retailer workbench, may be any computer or machine capable of communicating with the independent system, including but not limited to communications through an ISP.

Initiation of System

Referring now to FIG. 2A, to participate in the system of the present invention, manufacturers enter into agreements with an operator of the independent system to become participating manufacturers, as indicated by line 64, and retailers enter into agreements with the operator of the independent system to become participating retailers, as indicated by line 66. As indicated by process 68, and further illustrated in FIGS. 3 and 4, the operator of the independent system 24 creates, establishes or obtains data tables 72 in the main processor 30 and data tables 78 in the database server 32 for the participating retailers and the participating manufacturers.

Figure 3:
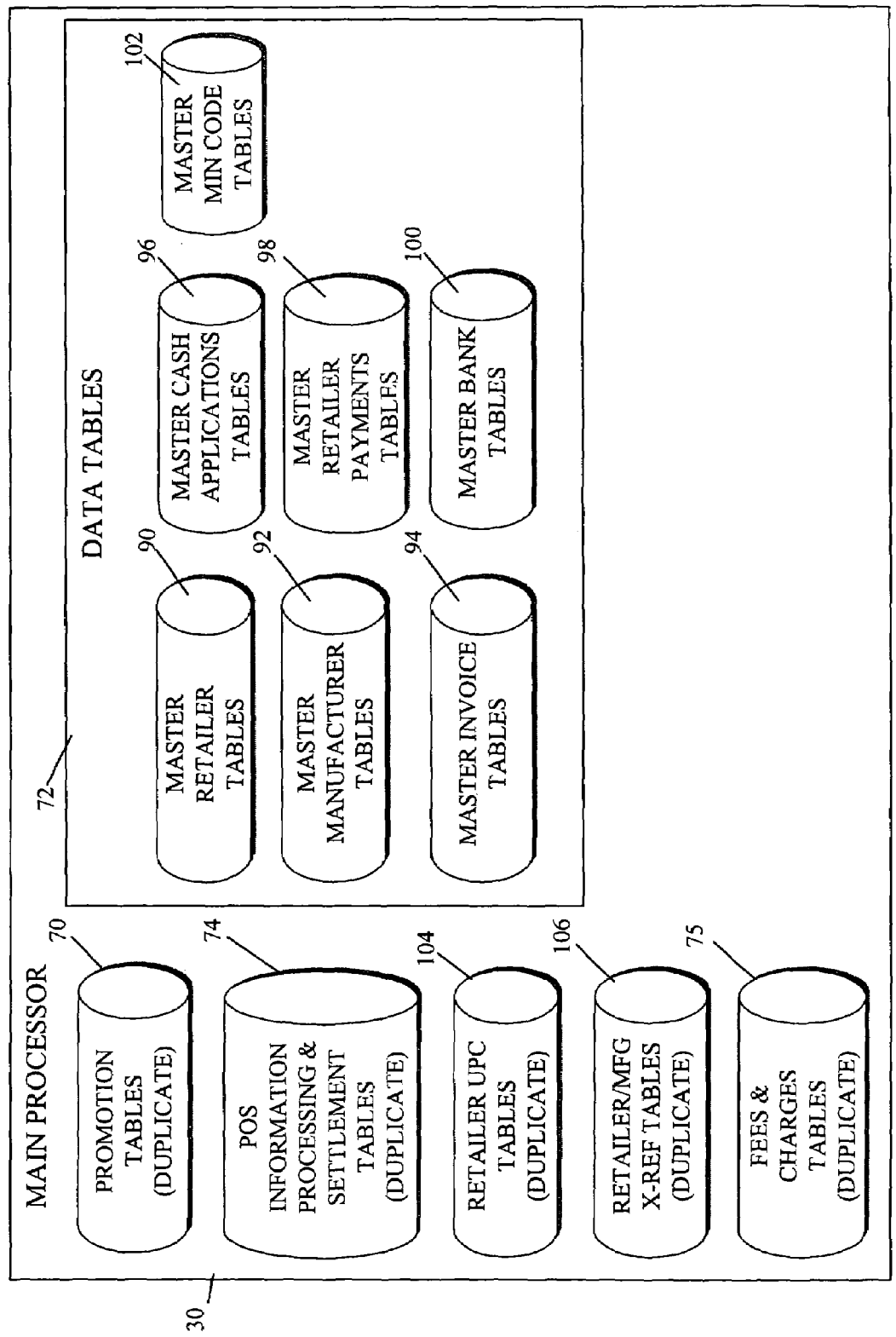
FIG. 3 is a schematic illustration of the data tables maintained on the main processor of the independent system of the present invention.

As illustrated in FIG. 3, the data tables 72 in the main processor 30 include:
   i) master retailer tables 90;
   ii) master manufacturer tables 92;
   iii) master invoice tables 94;
   iv) master cash applications tables 96;

v) master retailer payment tables 98;
vi) master bank tables 100; and
vii) master MIN code tables 102.

As further illustrated in FIG. 3, the main processor 30 also includes the following other data tables:
i) retailer/UPC tables 104;
ii) retailer/manufacturer promotion cross-reference tables 106;
iii) promotion tables 70;
iv) POS information processing & settlement tables 74; and
v) fees & charges tables 75.

Figure 4:
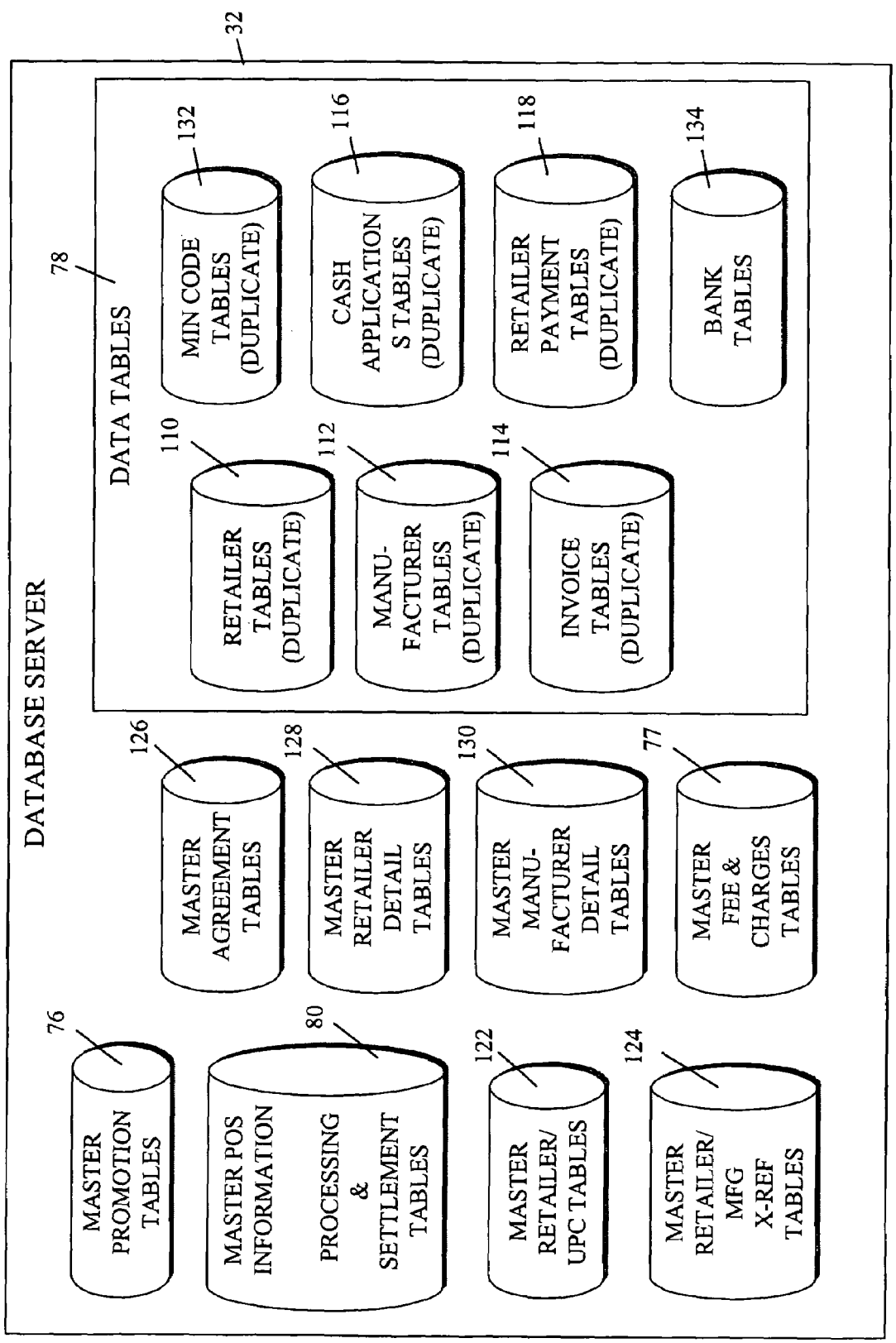
FIG. 4 is a schematic illustration of the data tables maintained on the database server of the independent system of the present invention.

As illustrated in FIG. 4, the data tables 78 in the database server 32 include:
i) retailer tables 110;
ii) manufacturer tables 112;
iii) invoice tables 114;
iv) cash applications tables 116;
v) retailer payment tables 118;
vi) MIN code tables 132; and
vii) bank tables 134.

As further illustrated in FIG. 4, the database server 32 also includes the following other data tables:
i) master promotion tables 76;
ii) master POS Information processing & settlement tables 80;
iii) master fees and charges tables 77;
iv) master user tables 120;
v) master retailer/UPC tables 122;
vi) master retailer/manufacturer cross-reference tables 124;
vii) master agreement tables 126;
viii) master retailer detail tables 128; and
ix) master manufacturer detail tables 130.

In this embodiment, the data tables 78 on the database server 32 include many tables that are substantially duplicates of or an updated form of the data tables 72. Specifically, the retailer tables 110, manufacturer tables 112, invoice tables 114, cash application tables 116, retailer payment tables 118 and MIN code tables 132 are substantial duplicates of the corresponding data tables on the main processor 30.

It should be appreciated that an operator of the independent system of the present invention may provide other business services such as administering "consumer promotions" using a processor and database. Such databases may include relevant information for the system of the present invention. To aid in implementing the scan-based trade promotion administration system of the present invention, the independent system may utilize some of the databases already present on such preexisting database. For instance, the independent system operator may have a database containing a master retailer table containing retailer data. To save time and resources, the independent system operator can copy this database onto the database server 32 instead of re-creating the database. However, it should be appreciated that if these data tables are not present on the preexisting database, or if the independent system operator does not have or wish to employ this database, the system could be configured with the appropriate completely new databases on the database server 32.

If a main processor 30 and a database server 32 are employed in the system 10, then the duplicate data tables on the database server 32 are preferably updated and reconciled with the main processor 30 data tables on a daily basis. The retailer/UPC tables 104 and the retailer/manufacturer cross-reference tables 106 are substantial duplicates of the corresponding database server data tables 78. These substantial duplicate files are updated and reconciled with database server 32 files on a daily basis. It should be appreciated that these tables could be updated and reconciled at any desired interval.

The master retailer tables 90, and its database server substantial duplicate, the retailer tables 110, contain the required background information for all participating retailers using the system 10 of the present invention. In particular, the master retailer tables 90 contain information such as a retailer identification number, identification of any sub-entity of the retailer, the retailer's contact information (e.g., name, address, facsimile and telephone numbers, contact person) and payment information for paying the retailer. The system 10 retrieves information from the retailer tables 90 and 110 for all required retailer inputs.

The master manufacturer tables 92, and its database server substantial duplicate, the manufacturer tables 112, contain the required information for all participating manufacturers using the system of the present invention. The master manufacturer tables 92 contain information such as a manufacturer identification number, identification of any sub-entity of the manufacturer, the manufacturer's contact information (e.g., name, address, facsimile and telephone numbers, contact person), invoice information and status information. The system 10 draws on the manufacturer tables 92 and 112 for all required manufacturer inputs.

The master invoice tables 94, and its database server substantial duplicate, the invoice tables 114, contain information on the amounts of money invoiced to the manufacturers for the promotions.

The master cash application tables 96, and its database server substantial duplicate, the cash application tables 116, contain information on the amounts of money the manufacturers paid to either the independent system or the retailers for the promotions.

The master retailer payment tables 98, and its database server substantial duplicate, the retailer payment tables 118, contain information on the amounts of money the independent system paid the retailers for the promotions.

The master MIN tables 102, and its database server substantial duplicate, the MIN code tables 132, contain manufacturer identification numbers (MIN) codes. The MIN codes identify particular manufacturers for the system 10.

The master retailer/UPC tables 122, and its main processor substantial duplicate, the retailer/UPC tables 104, contain UPC numbers for products that a particular retailer carries and specific product information relating to each UPC number.

The master retailer/manufacturer cross-reference tables 124, and its main processor duplicate, the retailer/manufacturer tables 106, contain information for cross-referencing the independent system's master manufacturer tables with a participating retailer's identification code for the same manufacturer.

The master bank tables 100, and its database server substantial duplicate, the bank tables 134, contain bank or financial account information for manufacturers and retailers.

The master user table 120 on the database server 32 is a security table which contains individual user ID's, passwords, user types and other related security information. The master agreement tables 126 on the database server 33 contain information regarding the agreements between the participating manufacturers and independent system operator and agreements between the participating retailers and independent system operator. The retailer detail tables 128 and the manufacturer detail tables 130 contain supplementary information regarding the retailer and the manufacturer. After establishing the independent system's data tables 72 and 78, the participating retailers and manufacturers may use the system 10 of the present invention for recording, tracking, reporting, monitoring, verifying and settling of product promotions and scan-based trade promotions for other purposes as mentioned above or as described below.

The database server 32 includes the independent system operator's fees for administering the promotion in the individual promotion fee table 142 and creates and stores the individual promotion fee tables (not shown). The independent system 24 automatically pays the operator of the independent system a predetermined fee.

System Operation

Referring again to FIG. 2A, a manufacturer's representative from a participating manufacturer generates a promotion and presents the proposed promotion, via a deal sheet (not shown), to a participating retailer buyer, as indicated in block 84 and by line 85. A copy of each deal sheet, as indicated in block 86, is provided to an account administrator who for security reasons is preferably an employee of the operator of the independent system 24. The account administrator is preferably located at the headquarters of the retailer where the promotion is accepted. The account administrator prepares a retailer specific addendum to the deal sheet in a form customized for each retailer. The addendum contains additional information (including manufacturer identification and internal promotion identification numbers) which is required to be entered-into the database tables of the independent system of the present. As indicated in block 88, the account administrator accesses the system from an account administrator workbench 36 and uses a promotion data entry process of the system 10, as further illustrated in FIGS. 5 and 5A, to enter the proposed promotion into the set of master promotion tables 76 on the database server 32.

Figure 5:
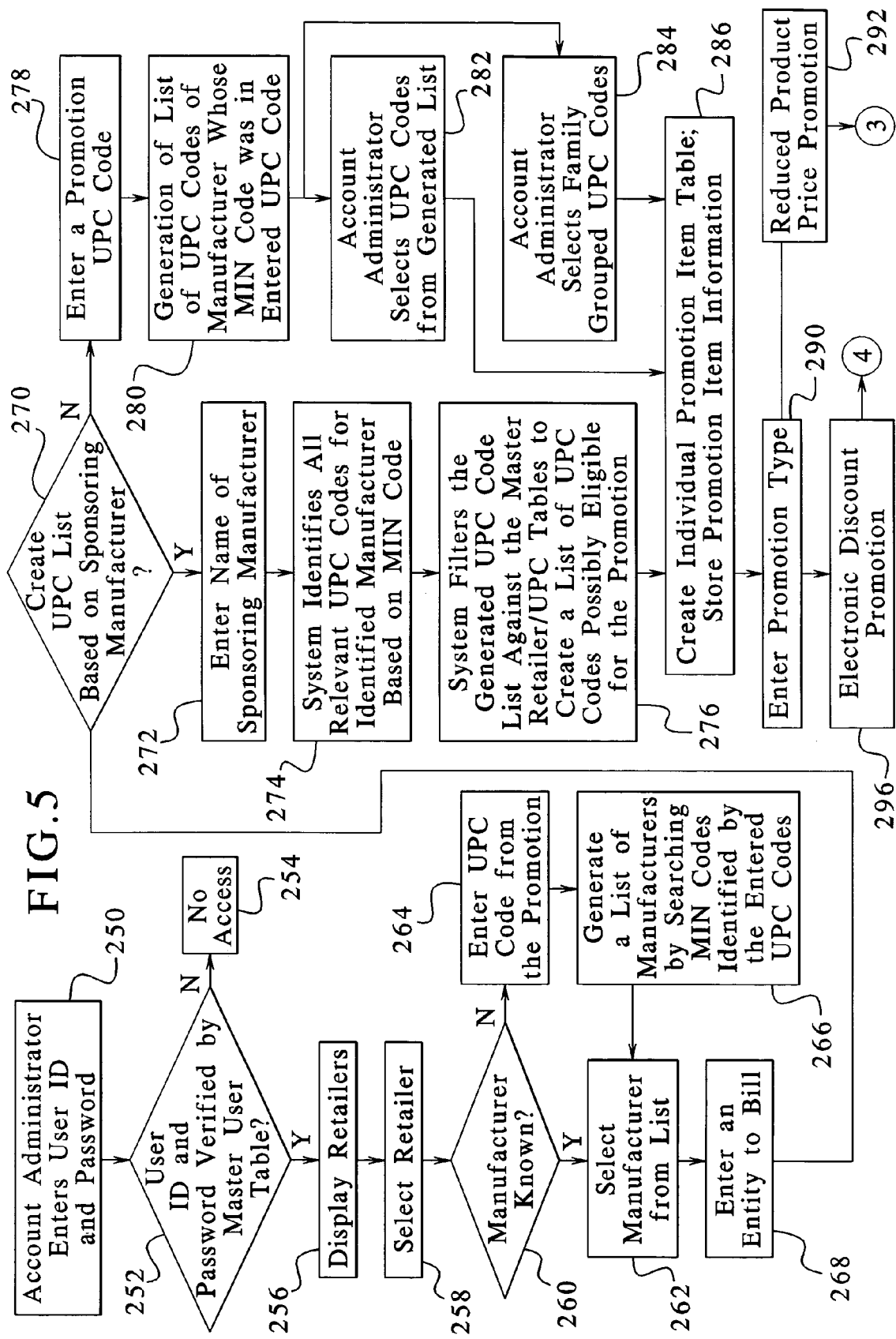
FIGS. 5 and 5A are flow diagrams depicting the entry of the terms of the promotions into the system.
Figure 5A:
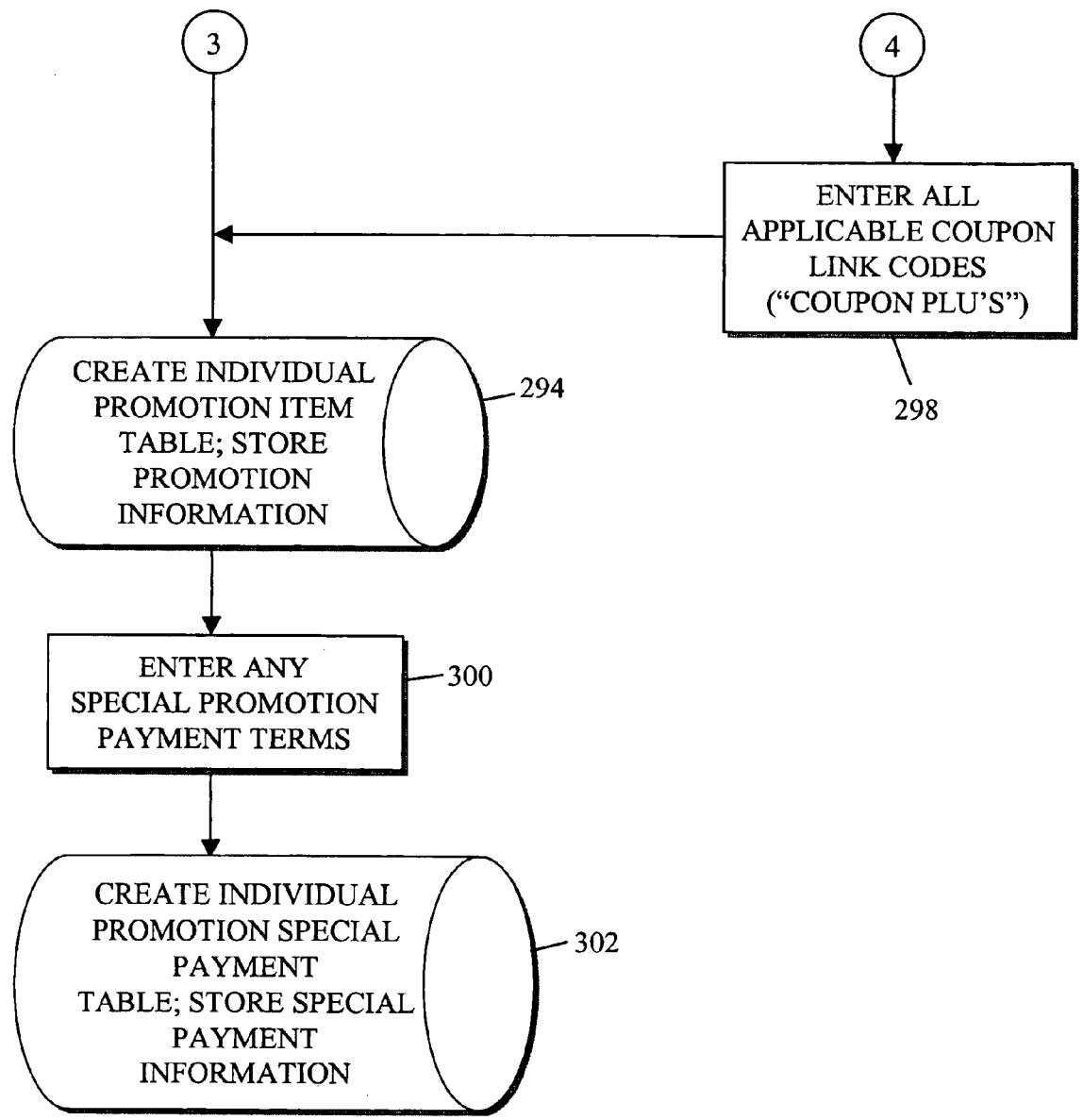

Referring now to FIGS. 5 and 5A, the account administrator enters his or her user ID and password to access the system 10 and the tables stored on the database server 24 as indicated by block 250. Using the information in master user tables 120, the database server 32 verifies the entered user ID and password, as indicated by decision diamond 252. If the user ID and password are not authorized, the database server 32 denies access to the database server 32 as indicated by block 254.

Entry of the Promotion Information

The database server 32 provides the account administrator with a list of retailers he or she is authorized to view, as indicated by block 256. Each account administrator is permitted to access or work on the accounts of certain predetermined retailers. The database server 32 enables the account administrator: (i) to select the appropriate retailer from the list as indicated by block 258; (ii) enter one or more products for the promotion for the selected retailer; and (iii) to enter the payment value which the manufacturer will pay the retailer for the discount given to the consumer on the sale of the promoted product in scan-based trade promotions or, the total payment the manufacturer will pay the retailer for the promotion in case of other promotions such advertising or display promotions. All of the information entered for a specific promotion is saved in an individual promotion table (not shown) which is one of the master promotion tables 76 stored in the database server 32. The master promotion tables 76, in turn, are backed-up, duplicated on or copied to a set of promotion tables 70 stored on the main processor 30.

The database server 32 enables the account administrator to enter the payment value of a promotion by the promoted product or by the entire promotion. The database server 32 stores this payment value in the individual promotion table. The payment value may be equal to, or more or less than the discount given to the consumer.

The database server 32 enables the account administrator to enter a promotion by selecting the manufacturer sponsoring the promotion. The database server 32 determines if the account administrator knows the manufacturer of the promoted product, as indicated by decision diamond 260. If the account administrator knows the manufacturer, the database server 32 presents a list of manufacturers to the account administrator. In particular, the database server 32 enables the account administrator to select a sponsoring manufacturer by selecting from a list of valid sponsoring manufacturers, as indicated by block 262. If the account administrator does not know the manufacturer, the account administrator may enter the UPC code of the promoted product in the database server 32 as indicated by block 264. The database server 32 searches the MIN code tables 132 and generates a list of manufacturers who have the same MIN code as the MIN code for the entered UPC code, as indicated by block 266. The database server 32 enables the account administrator to choose a manufacturer from this generated MIN code list, as also indicated by block 262. The database server 32 retrieves from the UPC code tables 132 all of the other UPC codes associated with the selected manufacturer, generating a list of potential promoted products for the account administrator. From this list, the account administrator is able to quickly select the other promoted products for the selected manufacturer and the retailer as discussed below. It is expected that the account administrator will enter several promotions into the independent system at the same sitting.

The database server 32 also enables the account administrator to choose an entity to bill, as indicated by block 268. The account administrator chooses this entity from a list of valid billable manufacturers provided by the database server 32, as indicated by block 268.

The database server 32 then enables the account administrator to create a table of UPC codes that will be part of the promotion, if one has not already been generated as discussed above. The database server 32 saves the UPC codes in the individual promotion item table (not shown) which is one of the master promotion tables 76 on the database server 32. More specifically, to create a promotion UPC list, the database server 32 determines if the account administrator desires to: (i) create a list based on the sponsoring manufacturer; or (ii) create a list by entering a UPC from the proposed promotion; or (iii) create a list by selecting "families" of UPC codes for products to be promoted, as indicated in decision diamond 270.

To create a promotion UPC list based on the sponsoring manufacturer, the database server 32 requires the account administrator to enter the name of the sponsoring manufacturer or enter a single UPC from the deal sheet as indicated by block 272. The database server 32 searches the MIN code table 132 and identifies all relevant UPC codes for the identified manufacturer, as indicated by block 274. The database server 32 compares (or filters) the manufacturer MIN code list against the master retailer/UPC table 122 for the designated retailer to create a list of UPC codes that are possibly eligible for the promotion, as indicated by block 276.

To create a promotion UPC list based on a UPC from the proposed promotion, the database server 32 requires the account administrator to enter a UPC code from the proposed promotion, as indicated by block 278, and applies this UPC code against the information in the MIN code table 132. As mentioned above, this search generates a complete UPC code list of all of the UPC codes offered by the manufacturers whose MIN code is found during the search, as indicated by block 280. After the database server 32 generates the possible UPC promotion list, the database server 32 enables the account administrator to select from this list only the UPC codes that are involved in the proposed promotion, as indicated by block 282. If the UPC codes for a manufacturer have been grouped into families of products that are promoted together (e.g., all flavors of a particular brand of yogurt, regular and diet versions of a soda, etc.), this simplifies the process of selecting promotional UPC codes. Instead of the account administrator having to individually select every UPC that is being promoted for the generated list of manufacturer's UPC codes, the account administrator can select a "family" button or icon on the workbench screen, as indicated by block 284. This will refresh the screen to only list UPC codes of the manufacturer that are in the same "family" as the entered UPC code instead of the manufacturer's entire UPC list. The account administrator selects (one at a time or as a group) the appropriate family of UPC's for the promoted products. Once the promoted product UPC code list is generated, no matter how it is created, the database server 32 saves this information to an individual promotion item table (not shown), as indicated in block 286.

The database server 32 enables the account administrator to enter the type of promotion being conducted, as indicated by block 290. As explained above, scan-based trade promotions are usually either: (1) reduced product price promotions; or (2) electronic discount promotions. If the promotion is a reduced product price promotion, as indicated by block 292, the database server 32 stores the identified UPC code products in the individual promotion item table (not shown), as indicated by block 294. If the promotion is an electronic discount promotion, as indicated by block 296, the system database enables the account administrator to enter all of the applicable coupon link codes ("Coupon PLU's"), as indicated by block 298. The Coupon PLU is a code which is linked to the product's UPC code such that when a discount triggering device is scanned (or alternatively, when the discount applies for all consumers), the scanned code is recognized and links to a given code number in the UPC file to credit the consumer with the appropriate discount. The database server 32 stores this information in the individual promotion item tables (not shown), as indicated by block 294.

The database server 32 enables the account administrator to enter any special promotion payment terms, as indicated by block 300, and creates and stores the individual promotion special payment table, as indicated by block 302. Special promotion payment terms can encompass anything particular to the individual promotion, but they are usually special advertising fees, special display fees, etc. These special promotion payment terms are also settled by the system 10. This special advertising or displays, and the associated fees, can be used in conjunction with a reduced price/electronic discount price promotion or they can be run on their own. If used in conjunction with a reduced price/ electronic discount promotion, the special promotion payment may be tied to the number of promoted product sold. If the special advertising or displays are not used in conjunction with a reduced price/electronic discount promotion, the special payment fee would be settled by the independent system 24 in the same way as reduced price/electronic discount promotions are settled, as discussed below.

The retailer must input similar promotion information into its POS computer system to enable the check-out stations to properly credit the promotion discount to the consumer as necessary. Some retailers will have an automated promotion system which may be adapted to download the promotion information for these tables directly to the database server.

Figure 2B:
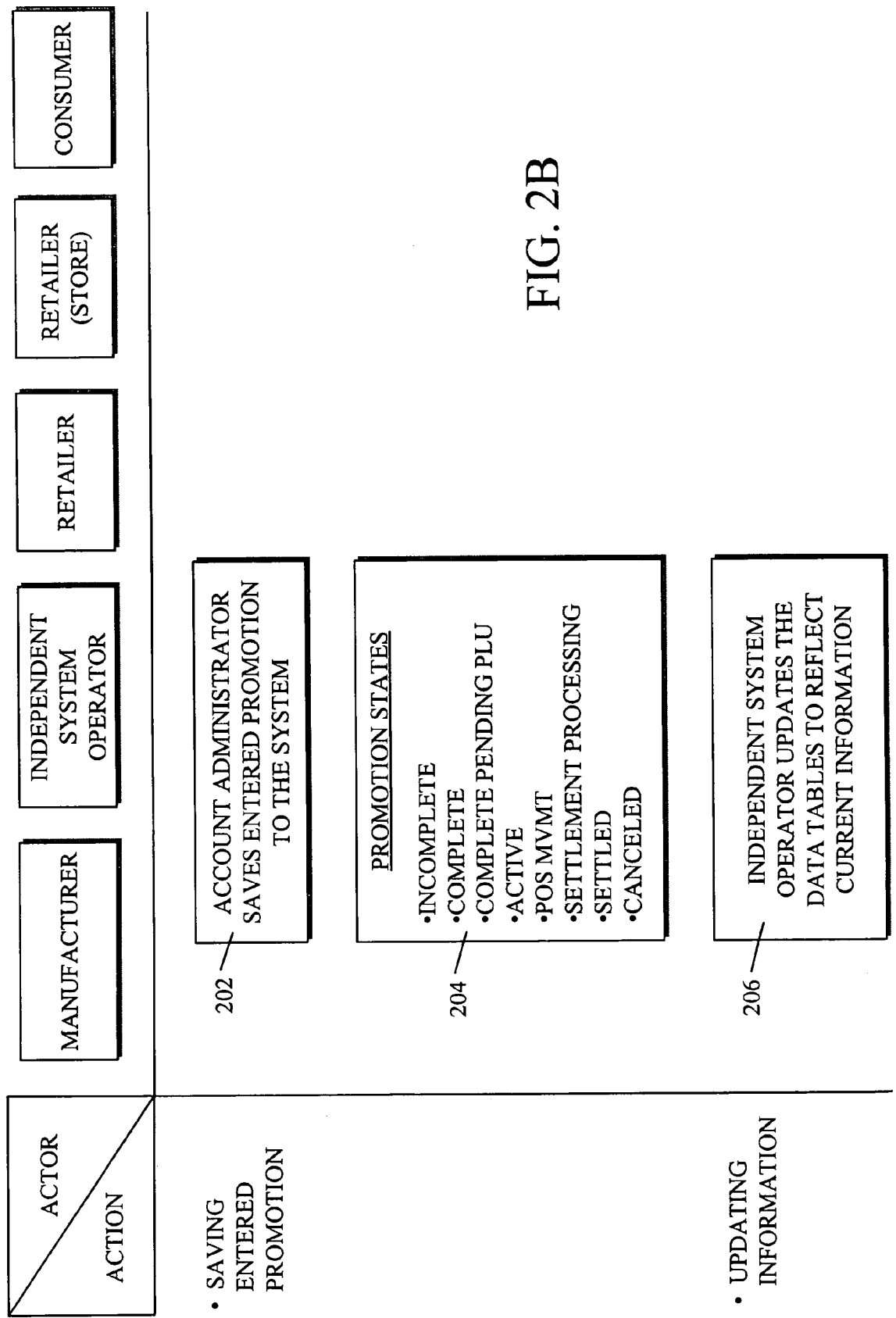
FIG. 2B is a flow diagram depicting the storing of the terms of the promotion, the alternative promotion status and duplication of data tables.

The database server 32 enables the account administrator to save or store the proposed promotion in the system at any time, as indicted by block 202 in FIG. 2B. The database server 32 further assures that the account administrator saves the proposed promotion information after all of the information discussed above is entered into the database server 32. The system 10 uses the saved files to update the master promotion tables 76 on the main processor 30.

Upon saving, as indicated in block 202, the independent system 24 determines the status of the promotion. The independent system 24 saves the status in the individual promotion table 140. In particular, the independent system 24 inputs one of the following status selections:

"Incomplete" means that all of the promotion information has not yet been entered into the system;

"Complete" means that all of the required promotion information has been entered into the system; and "Complete Pending PLU" means that all the required promotion information has been entered into the system except for coupon PLU information.

The status changes to one of the following after the promotion begins:

"Active" means that the promotion start date has passed and the promotion is currently running based on the assigned promotion dates;

"POS Movement" means that the promotion has started and the independent system has received product POS data or promoted product POS data or POS item movement files from the retailer;

"Settlement Processing" means that the independent system has begun settlement processing (and verification);

"Settled" means that the independent system has completed settlement for the promotion; and "Canceled" means that the promotion was canceled.

Figure 6:
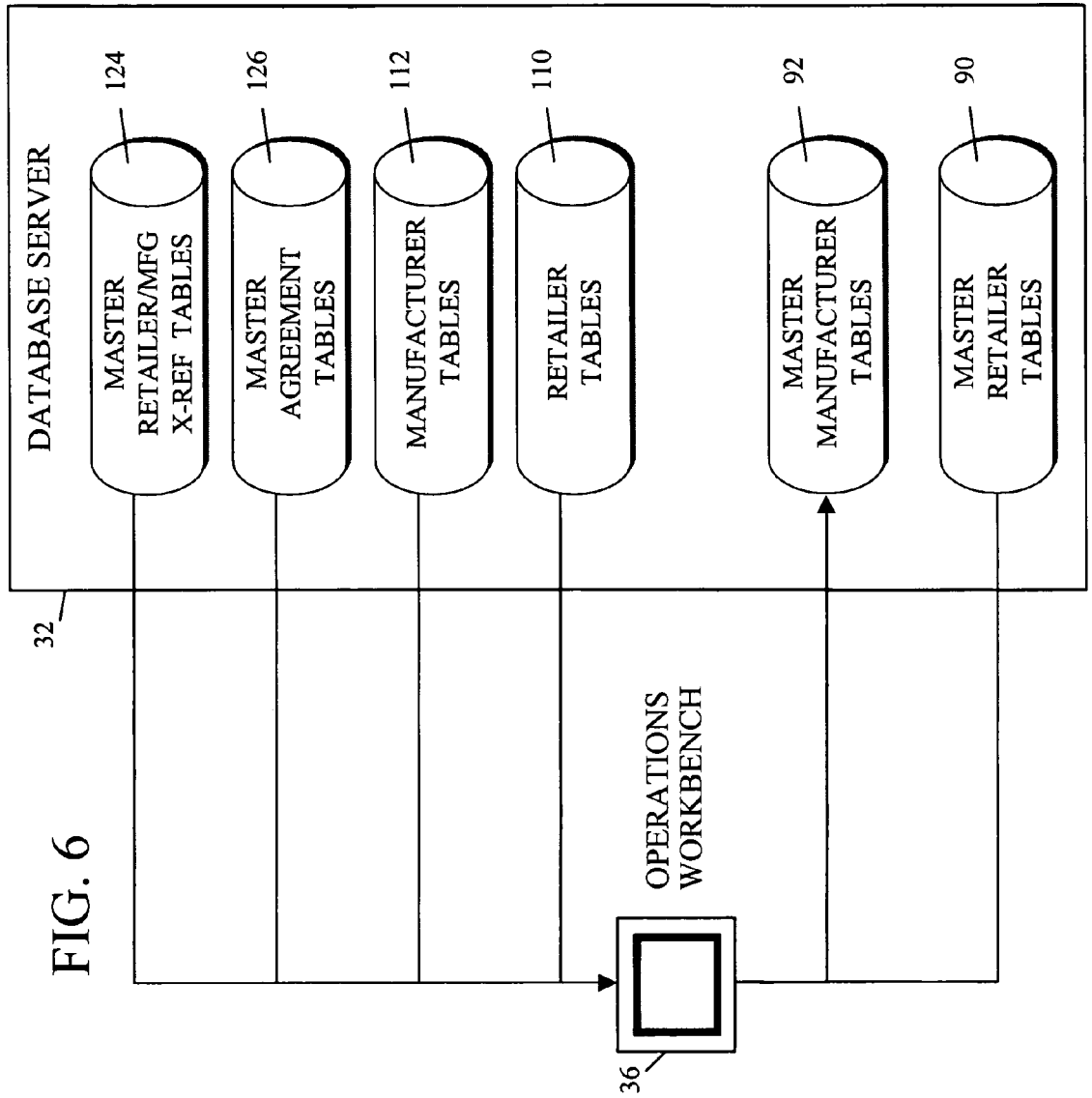
FIG. 6 is a schematic illustration of the addition of manufacturers and retailers to the system.
Figure 7:
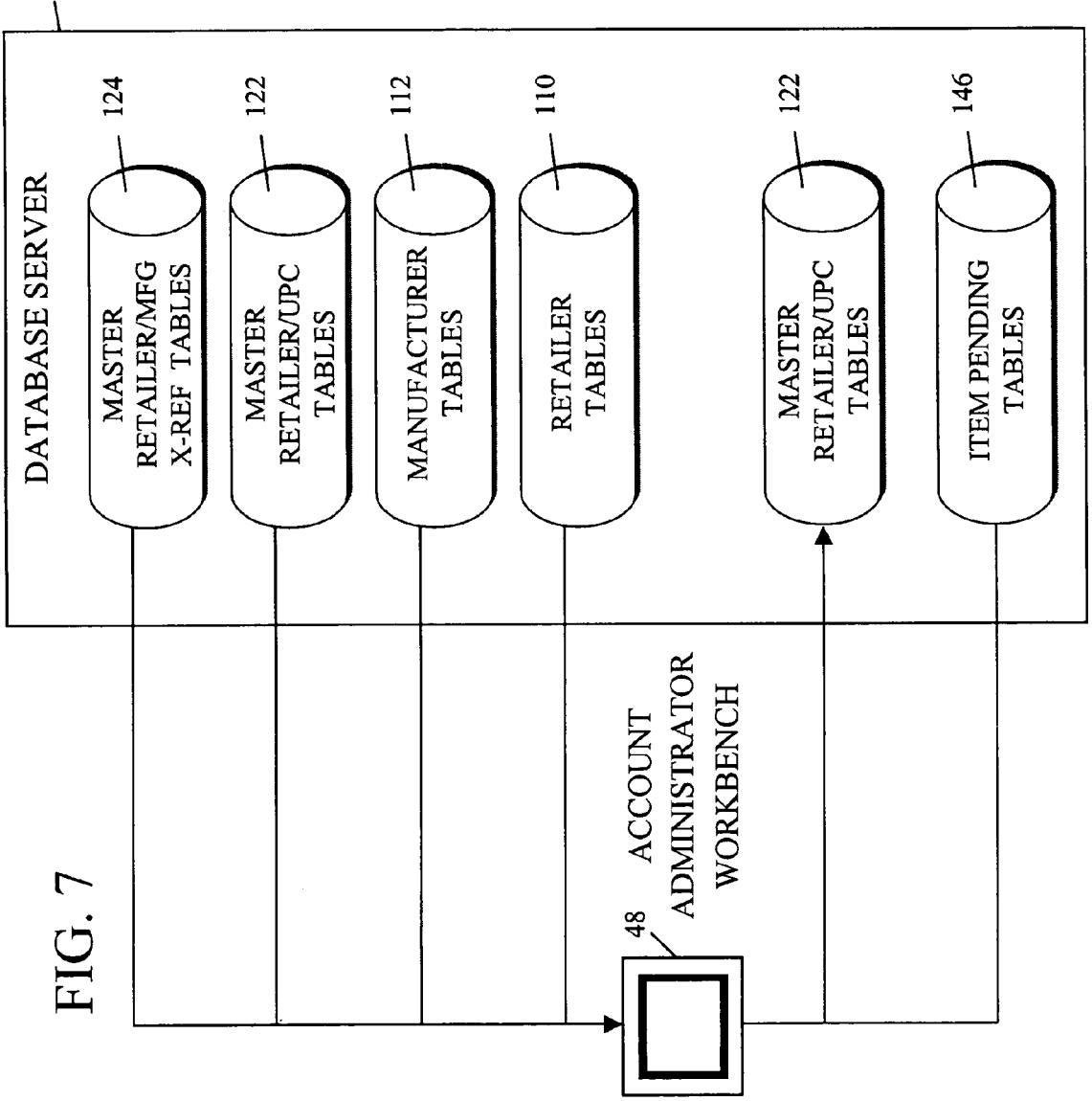
FIG. 7 is a schematic illustration of the addition of retailer UPC's to the system.

When inputting promotion information into the independent system 24, a manufacturer, a retailer or a product may not be listed in the independent system 24. In such case, as indicated in block 206, the independent system 24 enables the account administrator, (and the operations group at the operator of the independent system), to update the data tables in the appropriate manner. If a manufacturer or a retailer is not in the independent system 24, the independent system 24 will enable the operations group to update the master retailer tables 90 or the master manufacturer tables 92 to reflect the new information as generally illustrated in FIG. 6. In a similar manner, if a UPC code needs to be added to a retailer's list of available UPC codes, the independent system 24 enables the account administration to update the appropriate tables. When the account administrator enters the new UPC code information into the independent system 24, the independent system 24 flags this new information as a new item, saves it to an item pending table 146 and eventually updates the master retailer/UPC tables 122 as generally illustrated in FIG. 7.3.

Prior to the start of the promotion, for the reasons explained above, the retailer may change the terms of the promotion. The account administrator obtains these changes from the retailer and enters the changes in the independent system prior to the start of the promotion. The independent system stores the changed terms of the promotion in the appropriate database tables. After making the changes, the retailer and the manufacturer have access to the changed terms of the promotion stored in the database, as discussed in detail below, to verify the terms of the promotion and to determine if the retailer changed the terms of the promotion. The system may be adapted to notify the manufacturer that the retailer changed the terms of the promotion.

Promotion Execution

Figure 2C:
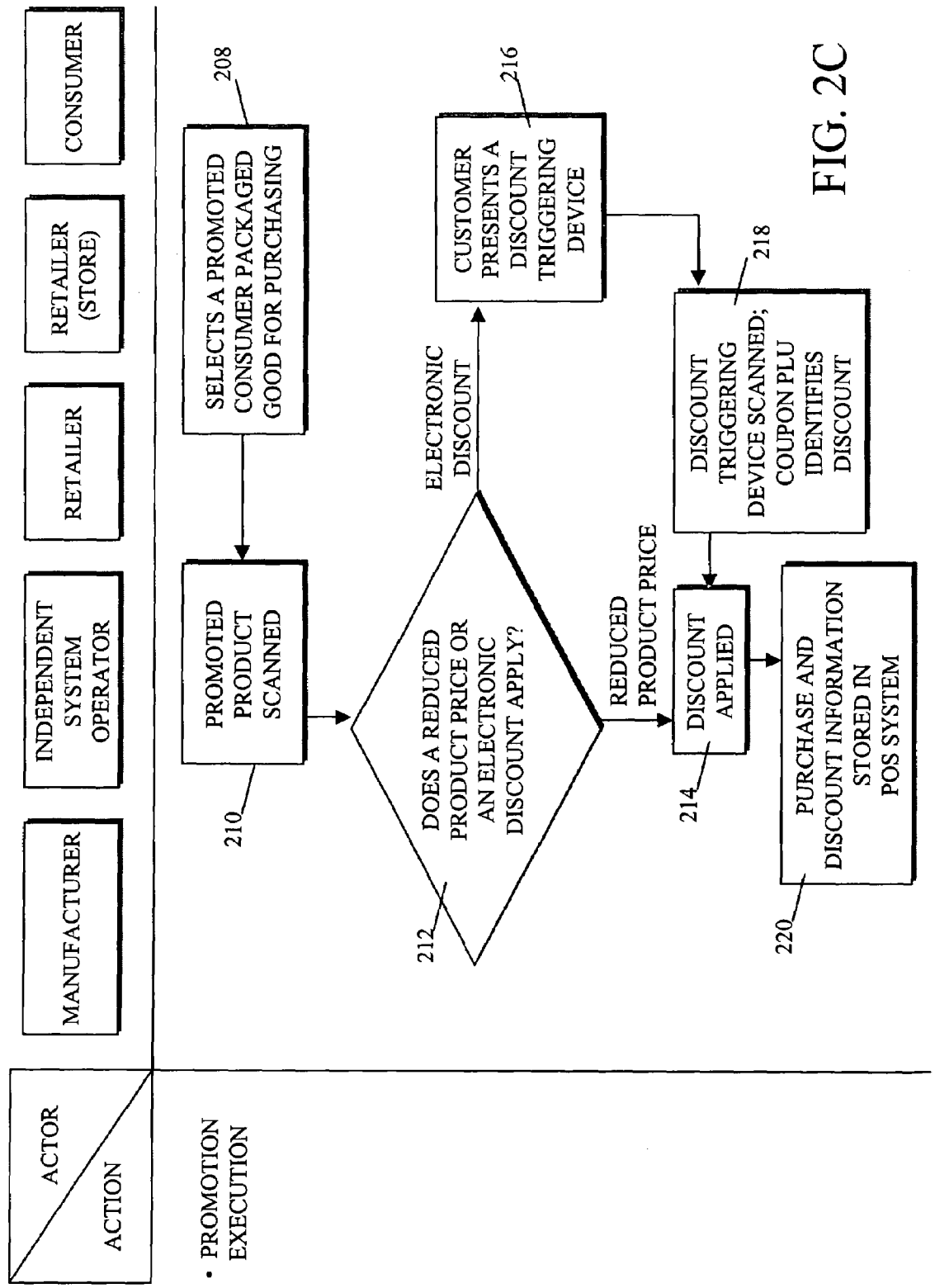
FIG. 2C is a flow diagram depicting the application of the discount to the consumer and the creation of the promoted product POS data.

Referring now to FIG. 2C, on the day when the promotion becomes active, the check-out stations in the retailer's stores 28 credit the consumers with the appropriate discounts, if any. More specially, as indicated in block 208, the consumer selects a product or consumer packaged good for purchasing and brings it to the check-out station. The sales clerk at the check-out station scans the selected product, as indicated in block 210. The in-store POS system 54 checks the UPC code to see if the product is part of an active promotion and, if so, it also checks the terms of the promotion to see if the promoted product is entitled to a reduced price or an electronic discount, as indicated in block 212. In the preferred embodiment, the POS system used by the retailer is IBM 4680/4690 technology. However, the system of the present invention is intended to operate with other suitable POS systems. If the promoted product is entitled to a reduced product price, the discount is applied directly in the purchase price, as indicated in block 214. If the product is entitled to an electronic discount, the consumer may be required to present some form of discount triggering device such as a frequent shopper card or other indication that the consumer is entitled to receive the electronic discount, as indicated in block 216. When the consumer presents the discount triggering device, the in-store POS system (or other appropriate system) applies the discount based on the coupon PLU, as indicated in blocks 214 and 218. It should be appreciated that the consumer may present the card prior to the scanning of any of the products and that the POS system will temporarily store the consumer's card information. It should also be appreciated that the discounts may be applied automatically utilizing standard POS linking which brings forth a coupon PLU by virtue of scanning the product. The in-store POS system stores all of the information regarding the purchase of the promoted product, the price of the promoted product and the discount. This stored information is referred to as promoted product POS data throughout this application.

Collecting the Promoted Product POS Data

Figure 2D:
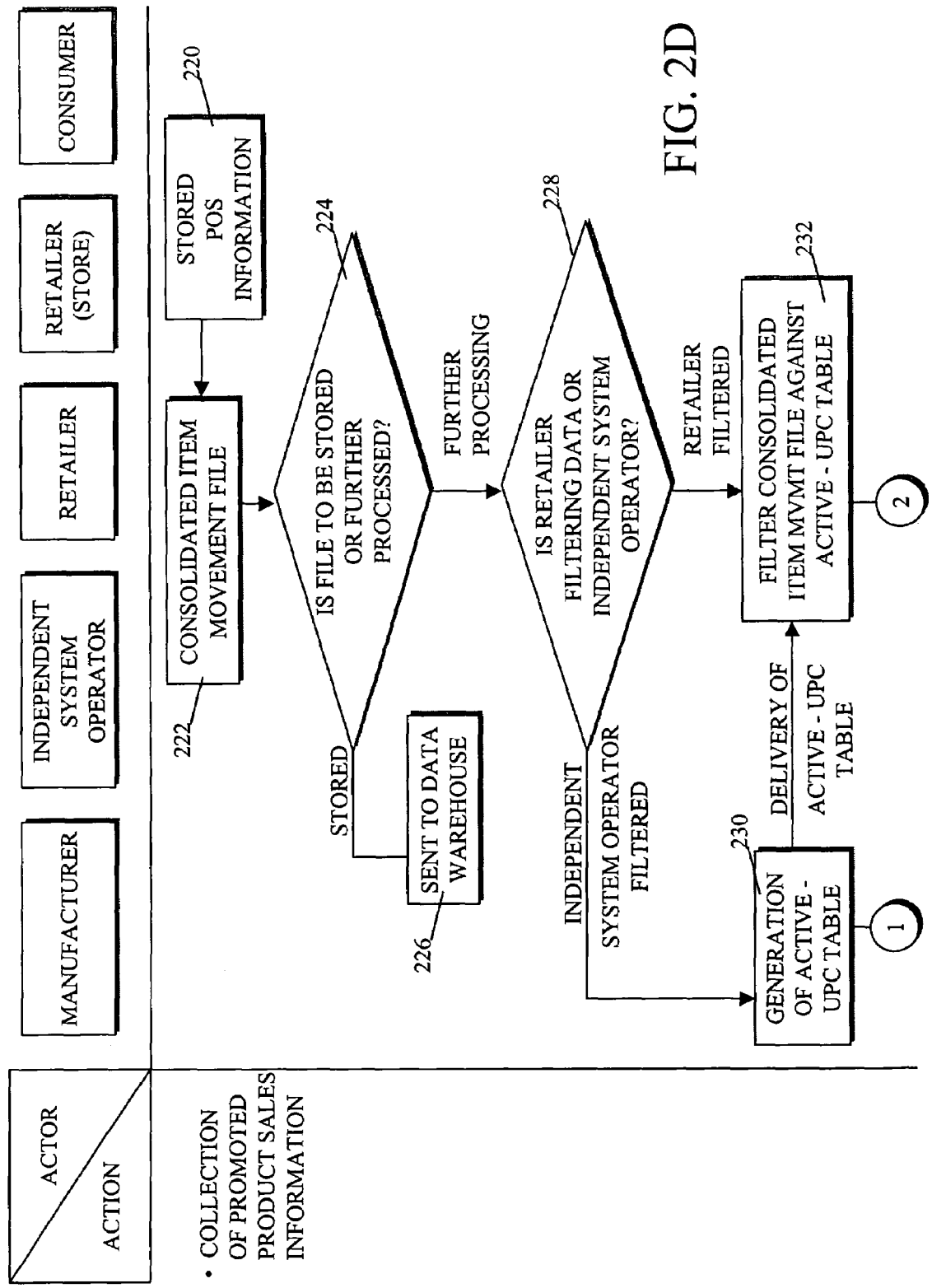
FIG. 2D is a flow diagram depicting the consolidation and filtering of the promoted product POS data.
Figure 2E:
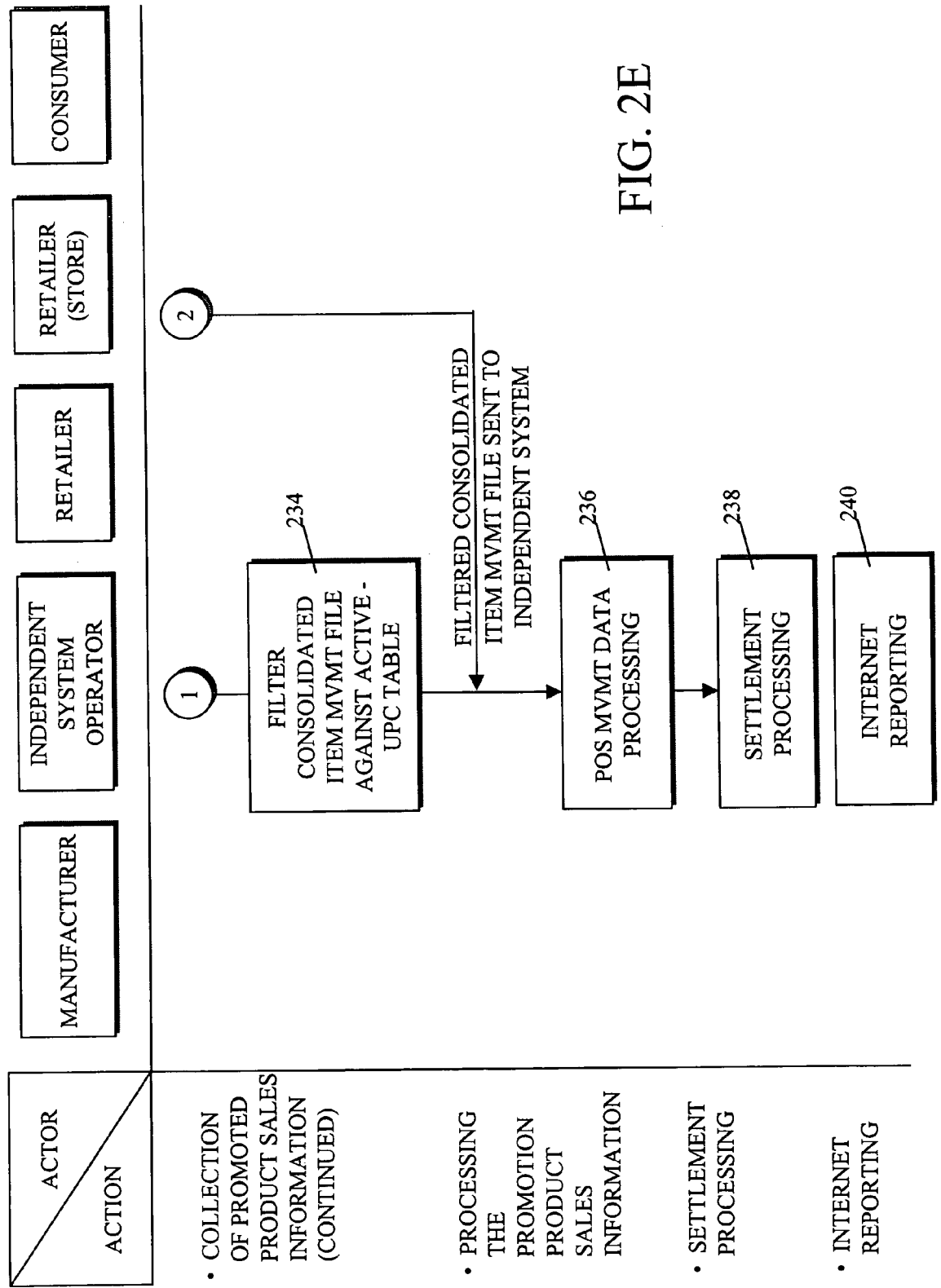
FIG. 2E is a flow diagram depicting filtering of the promoted product POS data, the processing of the promoted product POS data, the settlement processing and the reporting.

On a periodic basis, preferably at least once a week, the retailer system 20 collects the product POS data (including the promoted product POS data) from the retailer's in-store POS systems 54 as indicated in FIGS. 2D-E and generally illustrated in FIG. 1. The data collected from each store's POS system is stored in and also called an item movement file 56. The retailer processes the collected item movement files 56 for a variety of purposes.

Figure 8:
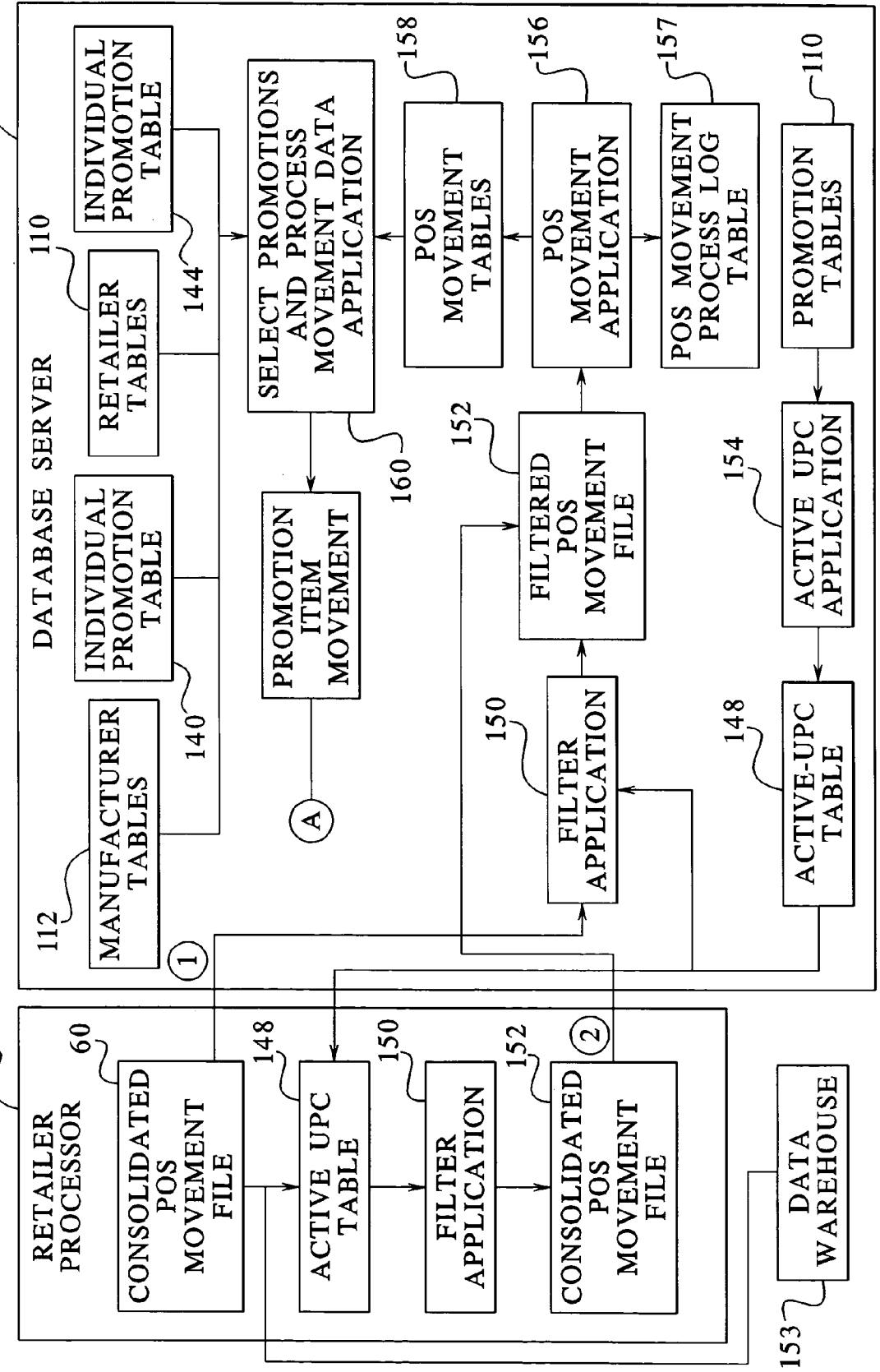
FIG. 8 is a schematic illustration of the processing of the promoted product POS data to create settlement tables.

The retailer system 20 retrieves all the stores' item movement files 56 in the retailer's main processor 40 via the retailer's WAN 58 as illustrated in FIG. 1. The retailer's main processor 40 consolidates or combines all of the retrieved item movement files 56 into a consolidated item movement file 60, as indicated in block 222 in FIG. 2D and as further depicted in FIGS. 1 and 8. As indicated in block 224 and depicted in FIG. 8, the consolidated item movement file 60 may either be sent to a data warehouse 153, as indicated in block 226, for storage or later processing or it may be further processed. If it is further processed either immediately or later, the retailer system 20 or the independent system 24 filters the consolidated item movement file 60 to process only the information relevant to promotionally active UPC codes (i.e., the promoted product POS data), as indicated in block 228. To filter the consolidated item movement file 60, the independent system 24, as shown in FIG. 8, runs an active UPC application 154 that references the master promotion tables 110 to generate an active UPC table 148, as indicated in block 230. The active UPC table 148 contains all the UPC codes that are promotionally active for a specific retailer.

If the retailer system 20 is to filter the consolidated item movement file 60 before transmitting it to the independent system 24, the independent system operator equips the retailer system 20 to perform this function. The independent system operator transmits the active UPC table 148 to the retailer on a scheduled basis. As indicated in block 232 and depicted in FIG. 8, the active UPC table 148 is used by the retailer in a filter application 150 to create a promoted product requested item table (not shown) on the retailer's processor 40. The promoted product requested item table holds information on promoted product UPC's. When the independent system 24 requests the filtered promoted product POS data, the retailer system 20 generates a filtered POS movement file 152. The filtered promoted product POS data or POS movement file 152 includes at the least the following data: the RMA, a store ID (if store level data), date, UPC/coupon PLU information, number of promoted products sold and dollar amount sold either by total amount or average price. As shown in FIG. 8 and indicated in FIG. 2E, the retailer system 20 transmits the filtered POS movement file 152 to the independent system database server 32. The filtered POS movement file 152 is preferably sent as a compressed suitably encrypted file.

If the independent system 24 filters the consolidated item movement file 60 instead of the retailer system 20, the independent system 24 receives the unfiltered consolidated item movement file 60 from the retailer system 20 and runs the filter application 150 against the active UPC table 148 to generate the promoted product POS data or filtered POS movement file 152, as indicated in block 234 and depicted in FIG. 8.

It should be appreciated that the start and end dates for the promoted product POS data will preferably not equate to the start and end dates of the promotion. Normally, the start and end dates for the promoted product POS data will be, respectively, earlier and later than the start and end dates of the promotion. This enables the independent system to capture data regarding the volume of the promoted product prior to the beginning and after the completion of the promotion. This captured non-promotion range activity is preferably used by the independent system to assist the independent system in auditing or verifying the promotion. If the sales activity of the promoted product is extremely high or unusual during the promotion time period when compared with consumers' normal buying patterns for the promoted product, the independent system can alert the manufacturer and the retailer that there is an error or that possible inappropriate activity or data recordation is occurring related to the promotion. The system 10 may suggest or generate an audit.

Processing the Promoted Product POS Data

Referring to FIG. 8, after the promoted product POS data or filtered POS movement file 152 is stored on the database server 32, a POS movement application 156 in the database server 32, as indicated in block 236, processes the promoted product POS data (i.e., in the filtered POS movement file 152). The POS movement application 156 determines whether the filtered POS movement file 152 contains new promoted product POS data or adjusted promoted product POS data. If it contains new promoted product POS data, the application 156 checks for duplicates, for key data values (e.g., retailer ID, RMA, dates, etc.) to see if they are present on the independent system's master data tables 78 and for consistency between the dates in the filtered POS movement file 152 and the promotion dates for that retailer in the master data tables 78. If these checks are violated, the POS movement application 156 does not load the POS movement file 152 onto the system. If the POS movement data is adjusted data, the POS movement application 156 verifies that there is a record to be modified. If there is no such record, the information is not loaded in the system. At this point, the POS movement application 156 also conducts any other verification checks deemed necessary prior to loading the file on the system.

If the filtered POS movement file 152 is determined to be acceptable by the POS movement application 156, the POS movement application 156 loads the promoted product POS data or filtered POS movement file 152 into the POS movement tables 158 which is one of the tables, among the others described below, of the POS information processing and settlement tables 80 and 74. The master POS information processing and settlement tables 80 reside on the database server 32. All of this activity is logged in the POS movement processing table 157.

The POS movement table 158 is further processed by a select promotions and process movement data application 160. The select promotions and process movement data application 160 identifies the retailer and the period of the retailer's item movement data (e.g., weekly, daily). The application 160 processes the movement data for all promotions that have a status of "active", "POS movement", or "settlement processing." The application 160 performs an audit application. The application 160 checks to see if the price of the product and the coupon PLU value is reasonable during the promotion. The application 160 also checks to see if the movement of product during the promotion was reasonable in relation to the volume of the same product sold before and after the promotion. If one or both these checks fail, the application 160 postpones the settlement of the promotion until the discrepancy is resolved and notifies the operator of the independent system via a report. If the movement data passes both of these checks, it is output to a promotion item movement table 162 and the POS movement status is changed to "settlement processing."

Figure 9:
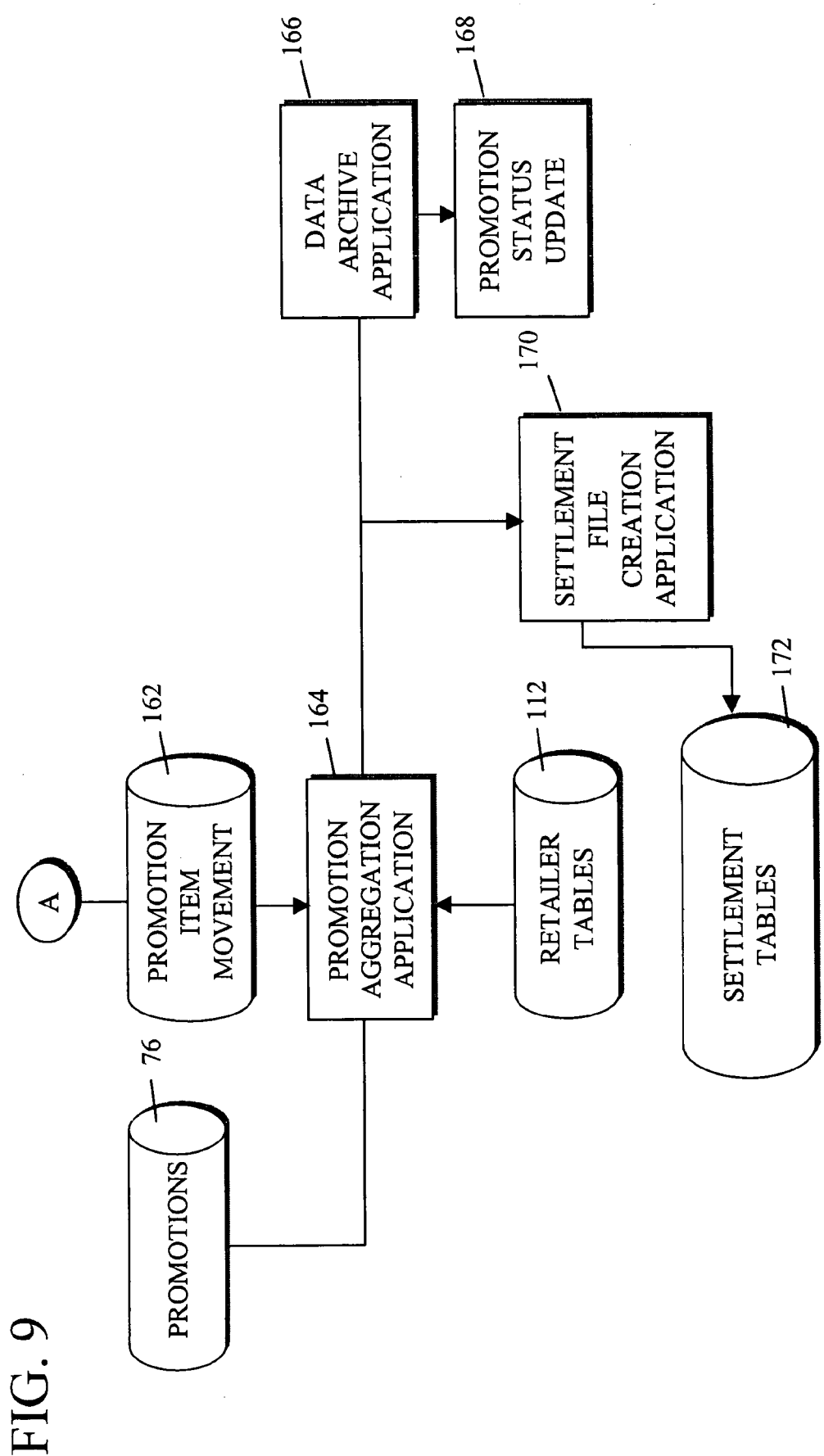
FIG. 9 is a schematic illustration of the processing of the promoted product POS data to create settlement tables.

Referring now to FIG. 9, a number of process steps are performed on the data to prepare the promotion for settlement. In particular, promotion aggregation application 164 aggregates all the promotion item movement tables 162 for a given manufacturer. The output from the promotion aggregation application 164 is archived by a data archive application 166 and is sent to a settlement file creation application 170 for further processing. After the data archive application 166 archives the processed promotion data, a promotion status update 168 routine updates the promotion status in the system. The settlement file creation application 170 takes the aggregated promotion data and generates settlement tables 172. The settlement tables 172 contain retailer and manufacturer information, specific promotion information, specific item or product movement information and specific fee information. The independent system 24 transmits settlement tables 172, preferably in a compressed format, to the main processor 30 for settlement processing.

Settlement Processing

Figure 10:
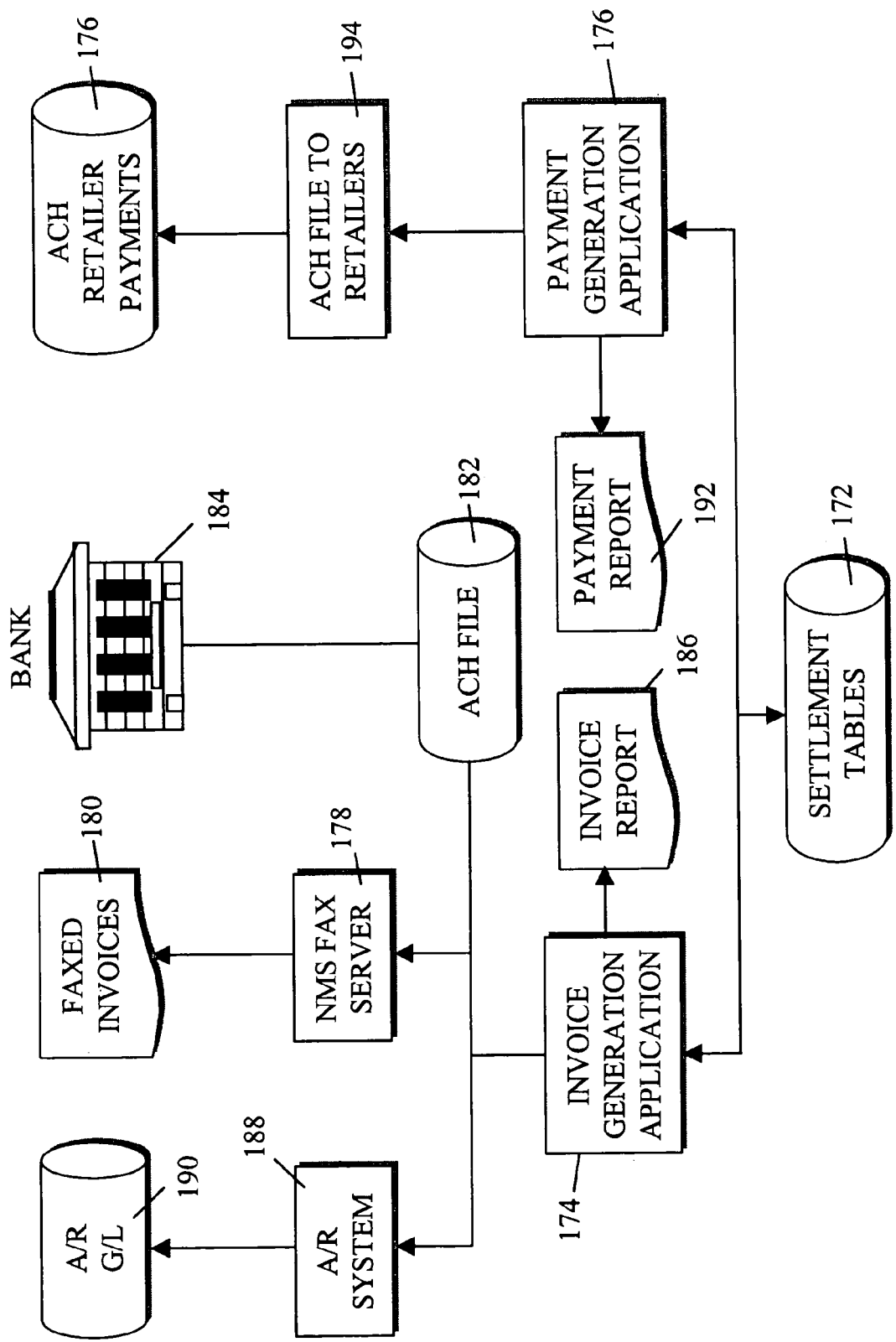
FIG. 10 is a schematic illustration of the payment and invoicing processing of the system of the present invention.

Referring now to FIG. 10, to settle the promotion the independent system 24 processes the settlement tables 172 using an invoice generation application 174. The application 174 uses the terms of the promotion to calculate the amount of money due to or that the manufacture owes to the retailer for the promotion based upon the number of promoted products sold or the payment value contracted amount, the discounts given by the retailer to the customers, and the terms of the promotion. The independent system may use one of three options for facilitating settlement of the promotions. These options include: (1) electronic funds transfer (EFT) payments through an appropriate financial institution or system; (2) preparation of an invoice which the manufacturer pays by check (or other payment method); or (3) deduction of the retailer's payments to the manufacturer for products supplied by the manufacturer. The independent system 24 also calculates the fees the retailer and manufacturer owe to the independent system operator for administering the promotions and includes these fees in the settlement.

Preferably the payment is through EFT. Use of EFT payment facilitates payment of the amounts of money the manufacturer owes to the retailer within hours of the processing of the promoted product POS data. If EFT is the form of payment, the system uses the Federal Reserve ACH Network to make the appropriate transfers of the amount of money owed by the manufacturer to the retailer. Specifically, the invoice generation application 174 sends the appropriate payment, account and transfer information or instructions in an automated clearing house (ACH) file 182 to a bank 184 in the Federal Reserve system. The bank 184 uses the ACH file 182 to directly debit the designated manufacturer's bank account 27 and credit the designated retailer account 29 as further illustrated in FIG. 1.

It should be appreciated that the EFT could occur through other suitable systems such as the automated teller machine (ATM) system. The ATM system is currently being enhanced to handle business to business transactions. This would enable the payments to occur on the same day as the promotion processing.

If the payment is by check upon receipt of an invoice, the invoice generation application 174 generates an invoice and an invoice report 186. The independent system 24 sends the invoice to the manufacturer for payment. The independent system 24 may alternatively send the invoice to the manufacturer by facsimile, if the manufacturer desires. In such case, the independent system 24 sends the invoice via a facsimile server 178. The invoice 180 details the amount of money the manufacturer owes the retailer which is running the promotion on the manufacturer's products. The invoice will likely include the amounts of money owed by the manufacture to a plurality of retailers.

When the payment option selected is deduction from the retailer's payment to the manufacturer, the system 10 tracks the retailer deductions to provide information related to the deductions which retailers make to the manufacturers. Generally, the independent system 24 sends a notice to both the manufacturer and the retailer indicating the appropriate amount for the retailer to deduct from its payment to the manufacturer and the retailer deducts the payment from a specific invoice. The system identifies the invoice to the manufacturer. Retailer deductions may occur, for instance when the manufacturer does not agree to an immediate debit to its account, the manufacturer does not have a designated or established bank account with an ACH authorization, when ACH debit has failed or as otherwise desired by the retailer.

More specifically, the system sends the retailer (and the account administrator) the deduction amounts from the settlement tables for one and preferably several promotions run by a retailer for a manufacturer. It should be appreciated that the report will include several promotions for several manufacturers. The independent system 24 also sends the amount of the deduction to the manufacturer sorted by retailer. The retailer looks for an invoice for the manufacturer. After the retailer finds an appropriate invoice, the retailer deducts an amount from the payment on that invoice.

The account administrator works with the retailer to collect: (i) the manufacturer's invoice number which will be paid minus the deduction; (ii) the manufacturer's invoice date; (iii) the products (brand or commodity) of the manufacturer's invoice the retailer will deduct for; and (iv) any other deducted amounts from the invoice. This information is saved in the settlement tables or other suitable tables. The manufacturer and the retailer may access the information, as discussed below.

It should be appreciated that the system could be adapted to provide the manufacturer with an informative direct feed of the invoicing information through the accounts receivable (A/R) system 188.

The payments made by the independent system 24 to the retailer are recorded by the payment generation application 176. The payment generation application 176 generates a payment report 192 and an ACH file to retailers 194. The ACH retailer payments are saved to an ACH retailer payment table 196.

Reporting

Figure 11:
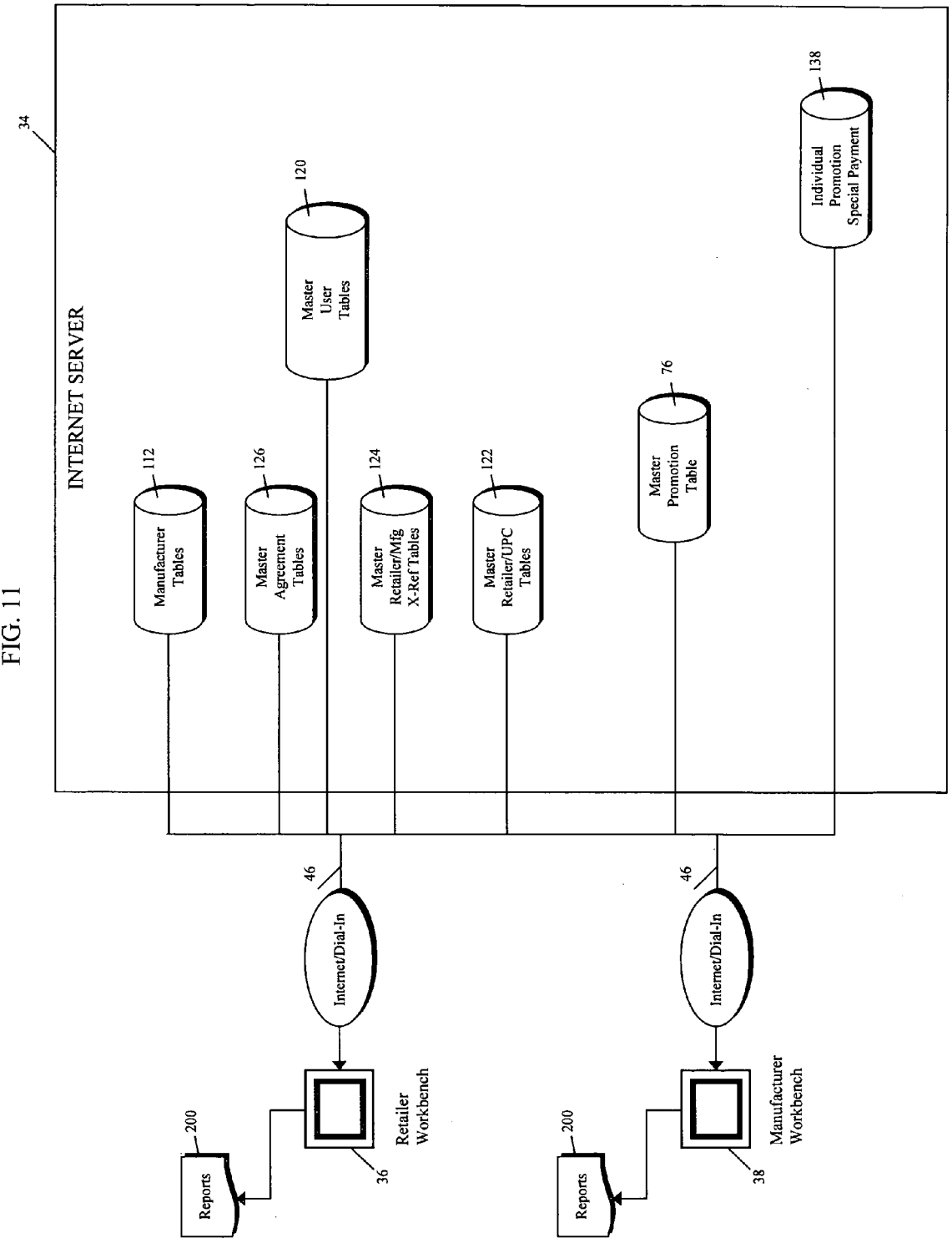
FIG. 11 is a schematic illustration of the reporting system of the present invention for the participating retailers and manufacturers.

As generally indicated by block 240 in FIG. 2E, and more specifically illustrated in FIG. 11, the system 10 of the present invention enables the participating retailers and manufacturers to monitor and verify the promotion from the initial creation of the promotion to completion of the promotion including the settlement of all amounts of money owed and paid to the retailer for the promotion, including retailer deductions. The system 10 preferably enables the retailers and manufacturers to monitor the promotion through any suitable direct communication line or internet accessible computer, terminal or device. For internet access, the participating retailers and manufacturers access the internet server 34 of the system 10 either through an internet service provider (ISP) or by directly accessing the internet server 34 via the communication lines 46 as generally illustrated in FIG. 1. It should be appreciated that the manufactures and retailers may be provided with direct limited access to the independent system to achieve a higher level of security than available through the internet.

To access the internet server 34, the user must enter a valid user ID and password. Before allowing the user access to any promotion information, the independent system 24 verifies that the user is entitled to access to the internet server 34 by checking the master user tables 120 which includes all of the authorized users and the information the users are authorized to access. After the independent system 24 determines that the user is authorized to obtain promotion information, the internet server 34 enables the user to view a multitude of information about certain promotions which the user is authorized to obtain. For instance, the user may only be authorized to obtain promotion information about a designated manufacturer. The internet server includes suitable firewalls and other conventional security measures from preventing a user from accessing information form database tables which the user is not entitled to access.

The internet server 34 displays promotion information in a variety of formats (e.g., graphical, statistical, charts, tables, etc.). The system 10 displays this information using conventional report generators such as CRYSTAL REPORTS. The independent system retrieves the information for generating the reports from the manufacturer tables 112, the master agreement tables 126, the master retailer/manufacturer cross-reference tables 124, the master retailer/UPC tables 122, the individual promotion special payment tables 138, the individual promotion tables and the individual promotion item tables on the database server 32. The information from these tables is organized into an understandable format for the participating retailers and manufacturers. The monitoring and reporting features enable the manufacturer and retailer to track or monitor the terms of the promotion, the status of the promotion, and the results of the promotion including the number of promoted products sold during the promotion (i.e., as it is being executed). This enables the manufacturer and retailer to determine how effective the promotion is while the promotion is in effect and after the promotion is completed. Access to this type of information enables the manufacturer and the retailer to tailor future promotions in a similar or more effective manner.

The manufacturer and the retailer may generate a hardcopy reports 200 of the promotion information for their promotions administered by on the system. They may also download this information or data to conduct their own further statistical analysis. The system of the present invention can also be employed to store and create a historical database of promotion information or data which could be used for subsequent analysis of promotions.

It should be appreciated that the system enables the manufacturer to determine if the retailer has changed the promotion (such as because of bad weather). The manufacturer could check the promotion terms on a regular basis, or preferably the independent system could send an electronic or paper notice to the manufacturer after the retailer changes a promotions.

It should also be appreciated that the system of the present invention could be adapted to communicate with the retailers and manufacturers through other suitable communication methods such as through extranet or paper communications.

It should be understood that modifications and variations may be effected without departing from the scope of the novel concepts of the present invention. It should also be understood that this application is only limited by the scope of the claims.

The invention claimed is:

1. A method for an independent system operator to administer a trade promotion for a product involving a manufacturer and a retailer having at least one store with an in-store POS system, said method comprising the steps of the independent system operator:

before a start of the trade promotion by the retailer, capturing terms of the trade promotion at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion;

before the start of the trade promotion by the retailer, storing the captured terms of the trade promotion in an independent system operator database and enabling the retailer and the manufacturer to access said terms of the trade promotion stored in the independent system operator database to independently verify said terms of the trade promotion;

after the start of the trade promotion by the retailer, collecting from the retailer product POS data from at least one in-store POS system of the retailer;

filtering the product POS data using the promoted product identification stored in the independent system operator database to obtain promoted product POS data;

processing the promoted product POS data in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the independent system operator database to determine an amount of money the manufacturer owes to the retailer for the trade promotion; and facilitating the manufacturer's payment of the amount of money owed to the retailer for the trade promotion.

2. The method of claim 1, which further includes the steps of the independent system operator: enabling the retailer to change the terms of the trade promotion prior to the start of the trade promotion, capturing the changed terms of the trade promotion and storing the captured changed terms of the trade promotion in the independent system operator database.

3. The method of claim 2, which further includes the step of the independent system operator enabling the retailer and the manufacturer to access the stored terms of the trade promotion stored in the independent system operator database to determine if the retailer changed the terms of the trade promotion.

4. The method of claim 1, which further includes the step of the independent system operator enabling the retailer and the manufacturer to access the processed promoted product POS data to determine the number of promoted products sold during the trade promotion.

5. The method of claim 4, which further includes the step of the independent system operator enabling the retailer and the manufacturer to access the processed promoted product POS data to determine the amount of money the manufacturer owes to the retailer for the trade promotion.

6. The method of claim 5, wherein the retailer and manufacturer use an internet to access the stored terms of the trade promotion in the independent system operator database, the number of promoted products sold during the trade promotion and the amount of money the manufacturer owes to the retailer for the trade promotion.

7. The method of claim 1, wherein the step of storing the captured terms of the trade promotion includes storing the terms of the trade promotion in at least one predefined table in the independent system operator database.

8. The method of claim 7, wherein the step of storing the captured terms of the trade promotion includes creating a UPC list for the promoted products.

9. The method of claim 8, wherein the step of storing the captured terms of the trade promotion includes generating a complete UPC code list of all of the UPC codes offered by the manufacturer.

10. The method of claim 9, wherein the step of storing the captured terms of the trade promotion includes selecting additional products being promoted from the complete UPC code list.

11. The method of claim 1, wherein the retailer has a plurality of stores with in-store POS systems and the step of collecting the product POS data includes collecting product POS data from the plurality of stores and consolidating all of the collected product POS data.

12. The method of claim 11, wherein the step of filtering the product POS data includes the step of generating a table of UPC codes for products active in the trade promotion.

13. The method of claim 11, wherein the step of filtering the product POS data includes the step of comparing the product POS data to the table of UPC codes to obtain the promoted product POS data.

14. The method of claim 1, which further includes the step of the independent system operator verifying that the promoted product POS data is within acceptable tolerances.

15. The method of claim 14, which includes the step of the independent system operator comparing the promoted product POS data for a period after the beginning of the trade promotion with product POS data for the same product for a period prior to the beginning of the trade promotion.

16. The method of claim 1, wherein processing the promoted product POS data in accordance with the stored terms of the trade promotion in the independent system operator database includes creating at least one settlement table in the independent system operator database which includes the number of promoted products sold by the retailer during the trade promotion, discounts given to consumers on the promoted products during the trade promotion, and the amount of money the manufacturer owes to the retailer for the trade promotion.

17. The method of claim 1, wherein the step of facilitating the manufacturer's payment to the retailer includes paying the retailer using an electronic funds transfer.

18. The method of claim 1, wherein the step of facilitating the manufacturer's payment to the retailer includes the independent system operator: sending an invoice to the manufacturer for payment, collecting the money the manufacturer owes to the retailer and paying the retailer the amount of money owed to the retailer.

19. The method of claim 1, wherein the step of facilitating the manufacturer's payment to the retailer includes the independent system operator sending notices to the retailer and the manufacturer of the amount of money owed by the manufacturer to the retailer, the retailer deducting the amount of money from a manufacturer invoice and identifying the manufacturer invoice number and the deduction to the manufacturer.

20. The method of claim 1, which further includes the step of the independent system operator consolidating all of the promoted product POS data for a plurality of trade promotions of products from the manufacturer.

21. The method of claim 20, which further includes the step of the independent system operator processing the consolidated promoted product POS data for a plurality of retailers for the manufacturer.

22. The method of claim 1, wherein the step of collecting product POS data from at least one in-store POS system of the retailer includes receiving product POS data from a retailer network after the retailer network receives the product POS data from the in-store POS system of at least one retailer store.

23. The method of claim 1, wherein the retailer has a plurality of retailer stores with in-store POS system, and wherein the step of collecting product POS data from at least one in-store POS system of the retailer includes receiving product POS data from a retailer network after the retailer network receives the product POS data from the in-store POS systems in said plurality of retailer stores.

24. A system for enabling an independent system operator to administer a trade promotion for a promoted product involving a manufacturer and a retailer having at least one store with an in-store POS system, said system comprising:

means for the independent system operator to capture and store before a start of the trade promotion by the retailer, the terms of the trade promotion for the promoted product at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion;

means for enabling the retailer and the manufacturer to access said stored terms of the trade promotion in said capturing and storing means before the start of the trade promotion by the retailer;

means for the independent system operator to collect from the retailer, product POS data from at least one in-store POS system of the retailer after the start of the trade promotion by the retailer;

means for the independent system operator to filter the product POS data using the promoted product identification to obtain promoted product POS data for the promoted product;

means for the independent system operator to determine the amount of money the manufacturer owes to the retailer based on the promoted product POS data and at least one of the stored (a) predetermined payment value the manufacturer will owe the retailer for each promoted product sold by the retailer during the trade promotion, and the stored (b) predetermined payment value the manufacturer will owe the retailer for conducting the trade promotion; and means for the independent system operator to pay the retailer the amount of money determined by the independent system operator to be owed to the retailer by the manufacturer for the trade promotion.

25. The system of claim 24, wherein the retailer has a plurality of stores with in-store POS systems and the collection means collects product POS data from the plurality of retailer stores and consolidates the product POS data into a consolidated file for transfer to the filtering means.

26. The system of claim 25, wherein the filtering means includes means for the independent system operator to compare the product POS data to a list of UPCs for the trade promotion to obtain the promoted product POS data.

27. The system of claim 26, where the determining means includes means for verifying that the promoted product POS data is within acceptable tolerances for the promoted product.

28. The system of claim 24, which further includes means for the independent system operator to report the promoted product POS data to the retailer and the manufacturer.

29. The system of claim 28, wherein the reporting means reports the promoted product POS data via the internet.

30. The system of claim 24, wherein the determining means consolidates the promoted product POS data for a plurality of products for the manufacturer.

31. A method for an independent system operator to administer a plurality of trade promotions for products involving a manufacturer and a retailer having at least one store with an in-store POS system, said method comprising the steps of the independent system operator:

before a start of the trade promotions by the retailer, storing the terms of the trade promotions at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion in an independent system operator database;

before a start of the trade promotions by the retailer, providing the retailer and manufacturer access to the independent system operator database to independently verify the terms of the trade promotions;

after the start of the trade promotions by the retailer, collecting from the retailer the product POS data during the trade promotions from at least one in-store POS system of the retailer;

filtering the product POS data based on the stored promoted product identification to obtain promoted product POS data;

storing the promoted product POS data in the independent system operator database;

determining an amount of money the manufacturer owes to the retailer based on the promoted product POS data and at least one of the stored (a) predetermined payment value the manufacturer will owe the retailer for each promoted product sold by the retailer during the trade promotion, and the stored (b) predetermined payment value the manufacturer will owe the retailer for conducting the trade promotion stored in the independent system operator database;

storing the amount of money the manufacturer owes the retailer in the independent system operator database;

after a start of the trade promotions by the retailer, providing the retailer and manufacturer access to the independent system operator database during the conduct of the trade promotions to determine at least a portion of the amount of money the manufacturer will owe the retailer for the trade promotions; and facilitating payment to the retailer of the amount of money determined to be owed to the retailer by the manufacturer.

32. The method of claim 31, which further includes the step of the independent system operator consolidating all of the promoted product POS data for a plurality of trade promotions of products from the manufacturer.

33. The method of claim 32, which further includes the step of the independent system operator processing the consolidated promoted product POS data for a plurality of retailers for the manufacturer.

34. A system for administering a trade promotion for a promoted product between a retailer and a manufacturer, said system comprising:

an independent system having a processor and an electronic database accessible by the processor which are adapted to:

before a start of the trade promotion by the retailer, capture and store the terms of the trade promotion for the promoted product at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion, and after the start of the trade promotion by the retailer, to collect from the retailer promoted product POS data for the promoted product of the trade promotion from the retailer, to process the collected promoted product POS data in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the electronic database to determine an amount of money the manufacturer owes to the retailer for the trade promotion, and to facilitate the manufacturer's payment of the amount of money determined to be owed to the retailer for the trade promotion;

a retailer system in communication with the independent system, having a processor adapted to, after the start of the trade promotion by the retailer, collect promoted product POS data for the promoted product from a plurality of retailer stores, to consolidate the promoted product POS data, and to transfer the promoted product POS data for the trade promotion to the independent system;

a manufacturer system in communication with the independent system; and said independent system further configured to before a start of the trade promotion by the retailer, provide the retailer system and the manufacturer system access to the independent system electronic database to independently verify said stored terms of the trade promotion, and after the start of the promotion by the retailer, provide the retailer system and the manufacturer system access to the independent system electronic database to determine the number of promoted products sold during the trade promotion and to determine the amount of money the manufacturer owes to the retailer for the trade promotion.

35. The system of claim 34, wherein the independent system provides the manufacturer system and the retailer system access to the independent system through the internet.

36. The system of claim 34, wherein the independent system is adapted to generate a table of UPC codes that are active in the trade promotion and to transfer said table of UPC codes to the retailer system.

37. The system of claim 36, wherein the retailer system is adapted to collect product POS data for all of the products the retailer sells and to use the table of UPC codes to filter the product POS data to obtain promoted product POS data for the promoted product.

38. The system of claim 34, wherein the independent system is adapted to verify that the promoted product POS data for the promoted product is within acceptable tolerances for the promoted product.

39. The system of claim 34, wherein the independent system is adapted to consolidate all of the promoted product POS data for a plurality of promoted products for the manufacturer.

40. The system of claim 39, wherein the independent system is adapted to process the consolidated promoted product POS data for a plurality of retailers for the manufacturer.

41. A method for an independent system operator to administer a trade promotion for a promoted product involving a manufacturer and a retailer having at least one store with an in-store POS system, said method comprising the steps of the independent system operator:

before a start of the trade promotion by the retailer, capturing terms of the trade promotion for the promoted product at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion;

before the start of the trade promotion by the retailer, storing the captured terms of the trade promotion in an independent system operator database and enabling the retailer and the manufacturer to access said terms of the trade promotion stored in the independent system operator database to independently verify said terms of the trade promotion;

after the start of the trade promotion by the retailer, receiving from the retailer promoted product POS data for the promoted product of the trade promotion from at least one in-store POS system of the retailer;

processing the promoted product POS data in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion stored in the independent system operator database to determine an amount of money the manufacturer owes to the retailer for the trade promotion; and facilitating the manufacturer's payment of the amount of money owed to the retailer for the trade promotion.

42. The method of claim 41, which further includes the step of the independent system operator: enabling the retailer to change the stored terms of the promotion prior to the start of the trade promotion, capturing the changed terms of the trade promotion and storing the changed terms of the trade promotion in the independent system operator database.

43. The method of claim 42, which further includes the step of the independent system operator enabling the retailer and the manufacturer to access the stored terms of the trade promotion stored in the independent system operator database to determine if the retailer changed the terms of the trade promotion.

44. The method of claim 41, which further includes the step of the independent system operator enabling the retailer and the manufacturer to access the processed promoted product POS data to determine the number of the promoted products sold during the trade promotion.

45. The method of claim 44, which further includes the step of the independent system operator enabling the retailer and the manufacturer to access the processed promoted product POS data to determine the amount of money the manufacturer owes to the retailer for the trade promotion.

46. The method of claim 45, wherein the retailer and manufacturer use an internet to access the stored terms of the trade promotion in the independent system operator database, the number of promoted products sold during the trade promotion and the amount of money the manufacturer owes to the retailer for the trade promotion.

47. The method of claim 41, wherein the step of storing the captured terms of the trade promotion includes storing the terms of the trade promotion in at least one predefined table in the independent system operator database.

48. The method of claim 47, wherein the step of storing the captured terms of the trade promotion includes creating a UPC list for the promoted products.

49. The method of claim 48, wherein the step of storing the captured terms of the trade promotion includes generating a complete UPC code list of all of the UPC codes offered by the manufacturer.

50. The method of claim 49, wherein the step of storing the captured terms of the trade promotion includes selecting additional products being promoted from the complete UPC code list.

51. The method of claim 41, wherein the retailer has a plurality of stores with in-store POS systems and the step of receiving the promoted product POS data includes receiving consolidated promoted product POS data from the plurality of stores.

52. The method of claim 51, wherein the step of receiving the promoted product POS data includes receiving consolidated promoted product POS data from a retailer network after the retailer network receives the promoted product POS data from the plurality of stores.

53. The method of claim 41, which further includes the step of the independent system operator verifying that the promoted product POS data is within acceptable tolerances.

54. The method of claim 53, which includes the step of the independent system operator comparing the promoted product POS data for a period after the beginning of the trade promotion with product POS data for the promoted product for a period prior to the beginning of the trade promotion.

55. The method of claim 53, wherein processing the promoted product POS data in accordance with the terms of the trade promotion includes creating at least one settlement table in the independent system operator database which includes the number of promoted products sold by the retailer during the trade promotion, discounts given to consumers on the promoted products during the trade promotion, and the amount of money the manufacturer owes to the retailer for the trade promotion.

56. The method of claim 41, wherein the step of facilitating the manufacturer's payment to the retailer includes the independent system operator paying the retailer using an electronic funds transfer.

57. The method of claim 41, wherein the step of facilitating the manufacturer's payment to the retailer includes the independent system operator: sending an invoice to the manufacturer for payment, collecting the money the manufacturer owes to the retailer and paying the retailer the amount of money owed to the retailer.

58. The method of claim 41, wherein the step of facilitating the manufacturer's payment to the retailer includes the independent system operator sending notices to the retailer and the manufacturer of the amount of money owed by the manufacturer to the retailer, the retailer deducting the amount of money from a manufacturer invoice and identifying the manufacturer invoice number and the deduction to the manufacturer.

59. The method of claim 41, which further includes the step of the independent system operator consolidating all of the promoted product POS data for a plurality of trade promotions of products from the manufacturer.

60. The method of claim 59, which further includes the step of the independent system operator processing the consolidated promoted product POS data for a plurality of retailers for the manufacturer.

61. A system for enabling an independent system operator to administer a trade promotion for a promoted product involving a manufacturer and a retailer having at least one store with an in-store POS system, said system comprising:
    means for the independent system operator to capture and store, before a start of the trade promotion by the retailer, the terms of the trade promotion for the promoted product at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion;
    means for enabling the retailer and the manufacturer to access said stored terms of the trade promotion in said capturing and storing means before the start of the trade promotion by the retailer;
    means for the independent system operator to collect from the retailer, promoted product POS data for the promoted product from at least one in-store POS system of the retailer after the start of the trade promotion by the retailer;
    means for the independent system operator to determine the amount of money the manufacturer owes to the retailer based on the promoted product POS data and at least one of the stored (a) predetermined payment value the manufacturer will owe the retailer for each promoted product sold by the retailer during the trade promotion, and the stored (b) predetermined payment value the manufacturer will owe the retailer for conducting the trade promotion; and
    means for the independent system operator to pay the retailer the amount of money determined by the independent system operator to be owed to the retailer by the manufacturer for the trade promotion.

62. The system of claim 61, wherein the retailer has a plurality of stores with in-store POS systems and a retailer network which collects product POS data from the plurality of in-store POS systems in the plurality of stores and filters the consolidated product POS data to obtain consolidated promoted product POS data, and wherein the collecting means is adapted to receive the consolidated promoted product POS data from the retailer network.

63. The system of claim 61, where the determining means includes means for verifying that the promoted product POS data is within acceptable tolerances for the promoted product.

64. The system of claim 61, which further includes means for the independent system operator to report the promoted product POS data to the retailer and the manufacturer.

65. The system of claim 61, wherein the reporting means reports the promoted product POS data via an internet.

66. The system of claim 61, wherein the determining means consolidates the promoted product POS data for a plurality of trade promotions for the manufacturer and the paying means aggregates payments owed to the retailer by the manufacturer for said plurality of trade promotions.

67. A method for an independent system operator to administer a plurality of trade promotions for products involving a manufacturer and a retailer having at least one store with an in-store POS system, said method comprising the steps of the independent system operator:

before a start of the trade promotions by the retailer, storing the terms of the trade promotions at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion in an independent system operator database;

before the start of the trade promotions by the retailer, providing the retailer and manufacturer access to the independent system operator database to independently verify said stored terms of the trade promotions in the independent system operator database;

receiving from the retailer promoted product POS data during the trade promotions from at least one in-store POS system of the retailer;

storing the promoted product POS data in the independent system operator database;

determining an amount of money the manufacturer owes to the retailer based on the promoted product POS data and at least one of the stored (a) predetermined payment value the manufacturer will owe the retailer for each promoted product sold by the retailer during the trade promotion, and the stored (b) predetermined payment value the manufacturer will owe the retailer for conducting the trade promotion;

storing the amount of money the manufacturer owes the retailer in the independent system operator database;

after the start of the trade promotions by the retailer, providing the retailer and manufacturer access to the independent system operator database during the conduct of the trade promotions to determine at least a portion of the amount of money the manufacturer will owe the retailer for the trade promotions; and facilitating payment to the retailer of the amount of money determined to be owed to the retailer by the manufacturer.

68. The method of claim 67, which further includes the step of the independent system operator consolidating all of the promoted product POS data for a plurality of trade promotions of products from the manufacturer.

69. The method of claim 68, which further includes the step of the independent system operator processing the consolidated promoted product POS data for a plurality of retailers for the manufacturer.

70. A method for independent system operator to administer a trade promotion for a product involving a manufacturer and a retailer having at least one store with an in-store POS system, said method comprising the steps the independent system operator:

before a start of the trade promotion by the retailer, capturing terms of the trade promotion including an identification of the retailer, an identification of the manufacturer, a trade promotion type, a UPC Code for the promoted product, at least one of (a) a predetermined payment value the manufacturer will owe the retailer for each promoted product sold by the retailer during the trade promotion, and (b) a predetermined payment value the manufacturer will owe the retailer for conducting the trade promotion and link codes for associated discounts if the trade promotion is an electronic discount trade promotion;

before the start of the trade promotion by the retailer, storing said captured terms of the trade promotion in an independent system operator database and enabling the retailer and the manufacturer to access said terms of the trade promotion stored in the independent system operator database to independently verify said terms of the trade promotion;

after the start of the trade promotion by the retailer, receiving from the retailer promoted product POS data for said trade promotion from at least one in-store POS system of the retailer;

processing the promoted product POS data in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the independent system operator database to determine an amount of money the manufacturer owes to the retailer for the trade promotion; and facilitating the manufacturer's payment of the amount of money owed to the retailer for the trade promotion.

71. The method of claim 70, which further includes the step of the independent system operator: enabling the retailer to change at least one of the terms of the trade promotion prior to the start of the trade promotion, capturing the changed terms of the trade promotion and storing the captured changed terms of the trade promotion in the independent system operator database.

72. The method of claim 71, which further includes the step of the independent system operator enabling the retailer and the manufacturer to access the stored terms of the trade promotion stored in the independent system operator database to determine if the retailer changed any of the terms of the trade promotion.

73. The method of claim 70, which further includes the step of consolidating all of the promoted product POS data for a plurality of trade promotions of products from the manufacturer.

74. The method of claim 70, which further includes the step of processing the consolidated promoted product POS data for a plurality of retailers for the manufacturer.

75. The method of claim 70, wherein the step of capturing terms of the trade promotion further includes capturing special payment terms.

76. A method for an independent system operator to administer a plurality of trade promotions for a plurality of promoted products involving a plurality of manufacturers and a retailer having a plurality of stores with in-store POS systems, said method comprising the steps of the independent system operator:

before a start of the trade promotions by the retailer, capturing terms of each of the trade promotions for each of the promoted products at least including promoted product identifications and at least one of (a) a predetermined payment value the manufacturer will owe the retailer for each promoted product sold by the retailer during the trade promotion, and (b) a predetermined payment value the manufacturer will owe the retailer for conducting the trade promotion;

before the start of the trade promotions by the retailer, storing the captured terms of each of the trade promotions in at least one independent system database and enabling the retailer and the manufacturer to access said terms of the trade promotion stored in the independent system operator database to independently verify said terms of the trade promotion;

after the start of the trade promotions by the retailer, receiving from the retailer consolidated promoted product POS data including promoted product POS data for each of the promoted products from each of the in-store POS systems of the retailer;

processing the promoted product POS data the promoted products in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the independent system database for said promoted products to determine amounts of money the manufacturers owe to the retailer for each of the trade promotions; and facilitating the manufacturers' payments of the amounts of money owed to the retailer for each of the trade promotions.

77. A method for an independent system operator to administer a plurality of trade promotions for a plurality of promoted products involving a plurality of manufacturers and a plurality of retailers where each retailer has a plurality of stores with in-store POS systems, said method comprising the steps of the independent system operator:

before a start of the trade promotions by the retailer, capturing terms of each of the trade promotions for each of the promoted products at least including promoted product identifications and at least one of (a) a predetermined payment value the manufacturer will owe the retailer for each promoted product sold by the retailer during the trade promotion, and (b) a predetermined payment value the manufacturer will owe the retailer for conducting the trade promotion;

before the start of the trade promotions by the retailer, storing the terms of each of the trade promotions in at least one independent system database and enabling the retailer and the manufacturer to access said terms of the trade promotion stored in the independent system operator database to independently verify said terms of the trade promotion;

after the start of the trade promotions by the retailer, receiving from the retailer consolidated promoted product POS data for each of the promoted products from each of the in-store POS systems of the retailers;

processing the promoted product POS data for each of the promoted products in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the independent system database for said promoted products to determine amounts of money the manufacturers owe to the retailers for each of the trade promotions; and facilitating the manufacturers' payments of the amounts of money owed to the retailers for each of the trade promotions.

78. A method for an independent system operator to administer trade promotion for a promoted product involving a manufacturer and a retailer having at least one store with an in-store POS system, said method comprising the steps of the independent system operator:

before a start of the trade promotion by the retailer, capturing terms of the trade promotion for the promoted product at least including promoted product identification and at least one of (a) a predetermined payment value the manufacturer will owe the retailer for each promoted product sold by the retailer during the trade promotion, and (b) a predetermined payment value the manufacturer will owe the retailer for conducting the trade promotion;

before the start of the trade promotion by the retailer, storing the captured terms of the trade promotion in an independent system operator database;

before the start of the trade promotion by the retailer, enabling the retailer and the manufacturer to access the terms of the trade promotion stored in the independent system operator database to independently verify the terms of the trade promotion;

before the start of the trade promotion by the retailer, enabling the retailer to change at least one of the stored terms of the promotion prior to the start of the trade promotion, capturing any changed terms of the trade promotion and storing any changed terms of the trade promotion in the independent system operator database;

before the start of the trade promotion by the retailer, enabling the retailer and the manufacturer to access the stored terms of the trade promotion stored in the independent system operator database to independently verify the terms of the trade promotion and to determine if the retailer changed the terms of the trade promotion;

after the start of the trade promotion by the retailer, receiving from the retailer promoted product POS data for the promoted product of the trade promotion from at least one in-store POS system of the retailer;

processing the promoted product POS data in accordance with at least one of the stored (a) predetermined payment value the manufacturer will owe the retailer for each promoted product sold by the retailer during the trade promotion, and the stored (b) predetermined payment value the manufacturer will owe the retailer for conducting the trade promotion in the independent system operator database to determine an amount of money the manufacturer owes to the retailer for the trade promotion;

verifying that the promoted product POS data is within acceptable tolerances;

enabling the retailer and the manufacturer to access the processed promoted product POS data to determine the amount of money the manufacturer owes to the retailer for the trade promotion; and facilitating the manufacturer's payment of the amount of money owed to the retailer for the trade promotion.

79. The method of claim 78, which further includes the step of the independent system operator enabling the retailer and the manufacturer to access the processed promoted product POS data to determine the number of the promoted products sold during the trade promotion.

80. The method of claim 78, wherein the retailer has a plurality of stores with in-store POS systems and the step of receiving the promoted product POS data includes receiving consolidated promoted product POS data from the plurality of stores.

81. The method of claim 80, wherein the step of receiving the promoted POS data includes receiving consolidated promoted product POS data from a retailer network after the retailer network receives the promoted product POS data from the plurality of stores.

82. The method of claim 78, which includes the step of the independent system operator comparing the promoted product POS data for a period after the beginning of the trade promotion with product POS data for the promoted product for a period prior to the beginning of the trade promotion.

* * * * *